US011728969B2

(12) United States Patent
Bartolucci et al.

(10) Patent No.: US 11,728,969 B2
(45) Date of Patent: Aug. 15, 2023

(54) BLOCKCHAIN-IMPLEMENTED SECURITY SYSTEMS AND METHODS FOR BLINDED OUTCOME SELECTION

(71) Applicant: nChain Licensing AG, Zug (CH)

(72) Inventors: Silvia Bartolucci, London (GB); Pauline Bernat, London (GB); Daniel Joseph, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 418 days.

(21) Appl. No.: 16/770,387

(22) PCT Filed: Dec. 3, 2018

(86) PCT No.: PCT/IB2018/059555
§ 371 (c)(1),
(2) Date: Jun. 5, 2020

(87) PCT Pub. No.: WO2019/111125
PCT Pub. Date: Jun. 13, 2019

(65) Prior Publication Data
US 2020/0389292 A1     Dec. 10, 2020

(30) Foreign Application Priority Data
Dec. 7, 2017  (GB) ..................... 1720389

(51) Int. Cl.
*H04L 9/06*   (2006.01)
*H04L 9/30*   (2006.01)
(Continued)

(52) U.S. Cl.
CPC .......... *H04L 9/0637* (2013.01); *H04L 9/3066* (2013.01); *H04L 9/3239* (2013.01);
(Continued)

(58) Field of Classification Search
CPC ... H04L 9/0637; H04L 9/3066; H04L 9/3239; H04L 9/3247; H04L 9/50; H04L 2209/56
See application file for complete search history.

(56) References Cited

U.S. PATENT DOCUMENTS 10,423,961 B1 *   9/2019   El Defrawy .......... G06Q 20/065
2010/0329448 A1 *  12/2010   Rane ...................... H04L 9/008
                                                          380/28
(Continued)

FOREIGN PATENT DOCUMENTS

CN    106788985 A    5/2017
WO    2017145010 A1    8/2017

OTHER PUBLICATIONS

Ruffing et al., "Coinshuffle: Practical Decentralized Coin Mixing for Bitcoin", 2014, Springer International Publishing (Year: 2014).*
(Continued)

*Primary Examiner* — Taghi T Arani
*Assistant Examiner* — Blake I Narramore
(74) *Attorney, Agent, or Firm* — Davis Wright Tremaine LLP

(57) ABSTRACT

There may be provided a blockchain-implemented security method. It may be implemented using a blockchain network. Embodiments of the blockchain-implemented security method involve a first party and a second party. The blockchain-implemented security method generates a plurality of n cryptographic locks based on combinations of encrypted versions of a first plurality of n secrets generated by the first party and encrypted versions of a second plurality of n secrets generated by the second party. One secret belonging to the first plurality of n secrets generated by the first party is randomly selected. And a cryptographic key that unlocks a particular cryptographic lock of the plurality of n cryptographic locks is generated, wherein the particular crypto-
(Continued)

graphic lock corresponds to the randomly selected one secret belonging to the first plurality of n secrets generated by the first party.

18 Claims, 13 Drawing Sheets

(51) Int. Cl.
   H04L 9/32    (2006.01)
   H04L 9/00    (2022.01)
(52) U.S. Cl.
   CPC ............ *H04L 9/3247* (2013.01); *H04L 9/50* (2022.05); *H04L 2209/56* (2013.01)

(56) References Cited

U.S. PATENT DOCUMENTS

| | | | | |
|---|---|---|---|---|
| 2016/0300223 | A1* | 10/2016 | Grey | G06Q 20/3825 |
| 2017/0091750 | A1* | 3/2017 | Maim | H04L 9/14 |
| 2017/0244687 | A1* | 8/2017 | Moulds | H04L 9/0891 |
| 2018/0040040 | A1* | 2/2018 | Barski | G06Q 20/3678 |
| 2018/0234239 | A1* | 8/2018 | Hasegawa | G09C 1/00 |

OTHER PUBLICATIONS

Andreev et al., "Hidden in Plain Sight: Transacting Privately on a Blockchain," retrieved from http:blog.chain.com/hidden-in-plain-sight-transacting-privately-on-a-blockchain-835ab75c01cb, Feb. 7, 2017, 16 pages.

Coutu, "Privacy in Bitcoin through decentralized mixers," Université de Montréal Department of Computer Science and Operations Research, Master of Sciences Thesis, Apr. 30, 2014, 118 pages.

International Search Report and Written Opinion dated Mar. 8, 2019, Patent Application No. PCT/IB2018/059555, 13 pages.

Kosba et al., "Hawk: The Blockchain Model of Cryptography and Privacy-Preserving Smart Contracts," IEEE Symposium on Security and Privacy, May 22, 2016, 31 pages.

Maxwell, "[Bitcoin-development] [RFC] Canonical Input and Output Ordering in Transactions," retrieved from https://lists.linuxfoundation.org/pipermail/bitcoin-dev/2015-June/008656.html, Jun. 14, 2015, 2 pages.

McCorry et al., "Towards Bitcoin Payment Networks," Australasian Conference on Information Security and Privacy, Jul. 4, 2016, 20 pages.

Ruffing et al., "CoinShuffle: Practical Decentralized Coin Mixing for Bitcoin," European Symposium on Research in Computer Security, Sep. 7, 2014, Sep. 7, 2014 (revised Aug. 14, 2014), 21 pages.

Singh et al., "A Novel Proficient Blind Signature Scheme using ECC," International Journal of Computer Applications, 2014, 7 pages.

UK Commercial Search Report dated Mar. 16, 2018, Patent Application No. GB1720389.4, 4 pages.

UK IPO Search Report dated Jun. 7, 2018, Patent Application No. GB1720389.4, 4 pages.

\* cited by examiner

301 - Party B determines the number of $n$ transaction output options

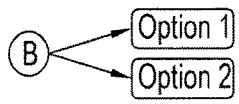

311 - Party A generates $n$ secrets for the $n$ transaction output options

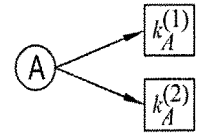

323 - Party B generates $n$ secrets for the $n$ transaction output options

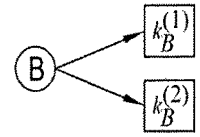

317 - Party A sends to Party B encrypted versions of the $n$ secrets it generated in 311

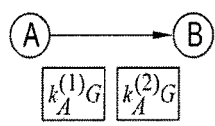

327 - Party B prepares the $n$ public key locks based on the combination of secrets

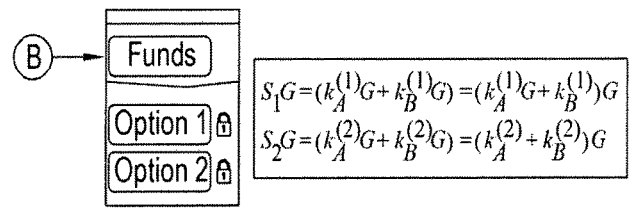

413 - Party B sends to Party A an encrypted combination of the $n$ secrets it generated in 311

417-419 - Party A verifies the correctness of the Commitment Transaction stored on the blockchain $$s_1 G + s_2 G \stackrel{?}{=} s_B G + k_A^{(1)} G + k_A^{(2)} G$$

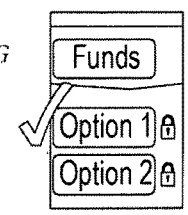

421-427 - Party A randomly selects one of the secrets it generated in 311 and sends the randomly secret to Party B

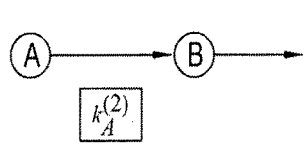

431-501 - Party B uses the private key to construct a signature for an unlocking script of a Payment Transaction, which is verified and mined for storage on the blockchain

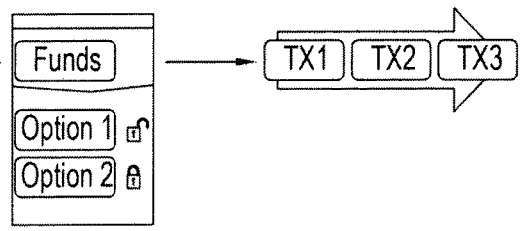

FIG. 7

BLOCKCHAIN-IMPLEMENTED SECURITY SYSTEMS AND METHODS FOR BLINDED OUTCOME SELECTION

This invention relates generally to distributed systems, and more particularly to methods and systems for improving the reliability and usability of cryptographically-enforced assets (including cryptocurrency) maintained on a blockchain.

In this document, we use the term 'blockchain' to include all forms of electronic, computer-based, distributed ledgers. These include but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is used herein to include all variations that derive from the Bitcoin protocol.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met (such as inclusion of a sufficient mining fee), the transaction is valid and the transaction may be written to the blockchain. Thus, in order for a transaction to be written to the blockchain, it must be i) validated by a node that receives the transaction if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Private keys are commonly used to control access to cryptographic assets maintained on a blockchain, such as spending cryptographic currency maintained on the blockchain. More specifically, a user is typically given a public address and a private key to send and receive cryptographic coins or tokens for other cryptographic assets that belong to the user. The private key is a secret number that allows the cryptographic coins or other cryptographic assets that belong to the user to be spent, withdrawn or otherwise transferred or encumbered. In Bitcoin, a private key is usually a 256-bit number. The public address is where the cryptographic assets of the user are deposited and received. The public address is created from the private key through a mathematical algorithm. However, it is practically impossible to invert the process by generating a private key from the public address.

Typically, a digital wallet is used to store the private key of a user. When a transaction is initiated by the user for spending, withdrawing, or otherwise transferring or encumbering cryptographic assets that belong to the user, the digital wallet creates a digital signature by processing the transaction with the private key. This upholds a secure system since the only way to generate a valid signature for any given transaction is to use the private key such that the signature for the transaction validates against the public address corresponding to the private key. The signature and the public address is used to verify that the transaction has come from the user (who is the holder of the private key corresponding to the public address) and ensures that elements of the transaction which are critical to security (such as the amount sent, the recipient address) cannot be changed once broadcasted. If these transaction elements get altered, the verification of the transaction based on the signature and public address of the user will fail.

If a user loses his/her private key, the user can no longer spend, withdraw, or otherwise transfer or encumber the cryptographic assets of the user that are associated with the private key. It is therefore, imperative to save the private key in a secure location. There are a number of ways that a digital wallet can store the private key of a user.

In one example, a private key can be printed on a paper-form or electronic document so that it can be retrieved when a transaction needs to be signed with the private key of the user. For example, the private key can possibly be printed in the form of a QR code that can be scanned when a transaction needs to be signed with the private key of the user. The private key can also be stored using cold-storage or a hardware wallet, which typically uses a smartcard or USB device that securely stores the private key of a user and signs transactions offline using the private key of the user. In another example, the private key can be stored using a hot wallet, which typically stores the private key and signs transactions using systems that are online and connected in some way to the Internet.

A commonly held misconception of Bitcoin, including among its users, is that the system is fully anonymous. Anonymity was indeed not a primary focus of the design of the protocol given that all confirmed transactions are publicly visible in the Blockchain. The ledger's transparency mitigates the risk of double-spending while offering attractive low transaction costs and fees, and no trusted centralised system, as in traditional banking systems.

Transactions include the input and output public addresses of users, which act as pseudonyms. Only the user in possession of the associated private key can sign the transactions. The Bitcoin protocol thus offers pseudonymity, which means that user addresses are not explicitly tied to any personal information. However, de-anonymization attacks aim at finding user information that allows one to associate bitcoin addresses with a real identity.

Prior to any de-anonymization phase, analyses will be performed to trace transactions and link them to a common entity. For instance, all addresses used as an input of a single transaction can be grouped into one identity and this information could be used to reconstruct the users' network.

The IP address(es) associated to a cryptocurrency user may also be used to compromise the Bitcoin network anonymity. Indeed, a malicious adversary may succeed in linking a public key to an IP address, tracking all transactions submitted by a given user. Moreover, IP information may be used to retrieve the real user's identity as well; this result could be achieved by combining this IP information with other sources, e.g., Internet forums and social media. In such circumstances, generating multiple public-private key pairs for different sets of transactions or participating in mixing services as expedients to increase the anonymity of the operations may not be successful.

The development of coin mixing services within (and outside) the Bitcoin system has focused on enhancing the untraceability of coins flows and the unlinkability of transactions with the coins owner. These mixing services often require a trusted third party to gather participants and create the transaction that will be broadcast on the peer-to-peer network. Coin mixing services are the simplest and most efficient way to enforce untraceability, provided that user input and output are all of the same amount.

These solutions are not infallible. Different de-anonymization techniques using neural network and k-means cluster exist to cluster addresses together and match them with users. For instance, taint analysis measures the percentage of bitcoin in a given address received from another address and attempts to deduce relationships between input and output amounts in transactions.

Finally, machine learning algorithms analyse data and find patterns in chains of events. Although human nature is not completely predictable, it can be argued that humans make predictions based on the understanding of the behaviour of others in a given situation. In cryptocurrency systems, as they would in any standard banking systems, users are likely to obey patterns (morning coffee, monthly donation, use of coin mixing services in specific conditions, etc.), which may be tracked and exploited by such machine learning algorithms. Analysing the user habits, such as 'level of activity', 'transaction timestamp' or 'amount exchanged' an attacker trying to de-anonymize the currency may be able to reconstruct the user network. This suggests that a user's behaviour may leak information directly usable by an attacker. Due to the public nature of the Bitcoin system and of the transaction history, the potential for such de-anonymize attacks raises concerns of many different parties such as financial regulators, protocol designers, and security analysts.

Thus, in accordance with the present invention there is provided blockchain-implemented, cryptographically-enforced security methods and devices. These may involve a first party and a second party whereby actions of the first party introduce randomness into the behaviour of the second party. Embodiments of the invention enhance security by reducing the likelihood of malicious attacks and compromises. Thus, embodiments of the invention provide an improved blockchain network.

The invention can also be described as using cryptographic techniques to control the locking/unlocking of resources on a blockchain, which providing enhanced security for the user.

In embodiments, the blockchain-implemented security method may involve:
  combining encrypted versions of a first plurality of n secrets generated by the first party and encrypted versions of a second plurality of n secrets generated by the second party to generate a plurality of n cryptographic locks;
  randomly selecting one secret belonging to the first plurality of n secrets generated by the first party; and
  generating a cryptographic key that unlocks a particular cryptographic lock of the plurality of n cryptographic locks, wherein the particular cryptographic lock corresponds to the randomly selected one secret belonging to the first plurality of n secrets generated by the first party.

Additionally or alternatively, the encrypted versions of the first plurality of n secrets generated by the first party can be communicated to the second party without revealing the first plurality of n secrets to the first party.

Additionally or alternatively, the plurality of n cryptographic locks can be generated by the second party without revealing the first plurality of n secrets generated by the first party to the second party.

Additionally or alternatively, the plurality of n cryptographic locks can be generated by the second party and verified by the first party to ensure that the plurality of n cryptographic locks is based on allowed combinations of encrypted versions of the first plurality of n secrets generated by the first party and encrypted versions of the second plurality of n secrets generated by the second party.

Additionally or alternatively, the one secret belonging to the first plurality of n secrets generated by the first party can be randomly selected by the first party and securely communicated to the second party.

Additionally or alternatively, the plurality of n cryptographic locks can be based on linear combinations of the encrypted versions of the first plurality of n secrets generated by the first party and the encrypted versions of the second plurality of n secrets generated by the second party.

Additionally or alternatively, the invention might use the plurality of n cryptographic locks to control transfer of digital assets, such as digital assets of the second party. In such embodiment(s), the random action of the first party in selecting the one secret belonging to the first plurality of n secrets introduces randomness into the behaviour of the second party, such as randomness in selecting a blockchain transaction output and/or constructing a cryptographic key that unlocks one of the n cryptographic locks for that blockchain transaction output.

Additionally or alternatively, the blockchain-implemented security method might be logically partitioned into four phases: an initialisation phase, a commitment phase, a payment phase and a refund phase.

In the initialisation phase, the second party may generate a plurality of n cryptographic locks based on linear combinations of encrypted version of a first plurality of n secrets generated by the first party and encrypted versions of a second plurality of n secrets generated by the second party without revealing the n secrets generated by the first party to the second party.

In the commitment phase, the second party may construct a first transaction (or commitment transaction) that includes at least one transaction input and a plurality of n transaction outputs, wherein the at least one transaction input of the first transaction points to digital assets of the second party, and wherein the n transaction outputs of the first transaction include locking scripts based on different ones of the plurality of n cryptographic locks. The first party verifies the first transaction using the encrypted version of the first plurality of n secrets as well as the encrypted versions of the second plurality of n secrets without revealing the n secrets generated by the second party to the first party. In response to successful verification of the first transaction, the first party randomly selects one particular secret of the first plurality of secrets generated by the first party and sends to the second party the one particular secret randomly selected by the first party. The second party determines a particular transaction output of the first transaction that corresponds to the one particular secret randomly selected by the first party.

In the payment phase, the second party may construct a second transaction (or payment transaction) which includes a transaction input and at least one transaction output, wherein the transaction input of the second transaction points to the particular transaction output of the first transaction that corresponds to the one particular secret randomly selected by the first party, and wherein the at least one transaction output of the second transaction includes an output value and a locking script for transferring digital assets of the second party. The transaction input of the second transaction can also include an unlocking script that provides a signature corresponding to the cryptographic lock provided by the locking script of the particular transaction output of the first transaction pointed to by the transaction input and possibly other required data (such as signature derived from a private key belonging to the second party) for releasing the encumbrance provided by the locking script of the particular transaction output of the first transaction.

In the refund phase, the second party may construct at least one third transaction (or refund transaction) which includes at least one transaction input and at least one transaction output, wherein the at least one transaction input of the third transaction points to a transaction output of the first transaction, and wherein the at least one transaction output of the third transaction includes an output value and a locking script for refunding digital assets to the second party. The transaction input(s) of the third transaction can also include an unlocking script that provides a signature that releases the encumbrance provided by the locking script of the corresponding transaction output of the first transaction pointed to by the transaction input(s).

Additionally or alternatively, the initialisation phase of the method can further involve the second party generating the number n (where n is an integer greater than 1) for the n transaction outputs of the first transaction and sending a message to the first party which includes the number n.

Additionally or alternatively, the initialisation phase of the method can involve the first party generating the first plurality of n secrets, encrypting the first plurality of n secrets utilizing elliptic curve cryptography to obtain n resultant data points that represent the encrypted versions of the first plurality of n secrets, and sending a message to the second party which includes the n resultant data points. The second party can recover the n resultant data points, generate the second plurality of n secrets, encrypt the second plurality of n secrets utilizing elliptic curve cryptography to obtain n resultant data points that represent the encrypted versions of the second plurality of n secrets, and generate n cryptographic locks from linear combinations of the n data points that represent the encrypted versions of the first plurality of n secrets and the n data points that represent the encrypted versions of the second plurality of n secrets.

Additionally or alternatively, the method can involve the first party sending a message to the second party which includes the one particular secret of the first plurality of n secrets which has been randomly selected by the first party. The second party can receive this message, determine an index associated with the particular transaction output of the first transaction that corresponds to the one particular secret randomly selected by the first party, and derive a private key by adding the one particular secret randomly selected by the first party and included in the received message and the secret generated by the second party and used to derive the public key lock for the particular transaction output of the first transaction. In the payment phase, the second party can use the index associated with the particular transaction output of the first transaction in constructing the transaction input of the second transaction. The second party can also use the private key derived from the addition of secrets jointly generated by the first party and second party to generate a signature corresponding to the public key lock provided by the locking script of the particular transaction output of the first transaction. The unlocking script with signature can be included in the transaction input of the second transaction.

Additionally or alternatively, the first transaction can be broadcast on a blockchain network for verification and mining in order to store the first transaction in a blockchain block of the blockchain network; and the second transaction can be broadcast on the blockchain network for verification and mining in order to store the second transaction in a blockchain block of the blockchain network. The blockchain can be a proof-of-work blockchain or a proof-of-stake blockchain.

Additionally or alternatively, a private key and public key pair can be associated with the second party. In the commitment phase, the locking scripts of the n transaction outputs of the first transaction can be based on the n cryptographic locks (derived from two sets of secrets jointly generated by the first party and second party) as well as the public key of the second party. For example, the locking scripts of the n transaction outputs of the first transaction can be released by either i) an unlocking script that provides a signature corresponding to the respective cryptographic lock of the transaction output option and a signature of the second party based on the second party's own private key, or ii) an unlocking script that provides a signature of the second party based on the second party's own private key.

Additionally or alternatively, the at least one third transaction of the refund phase can include a transaction input with an unlocking script that provides a signature of the second party based on the second party's own private key for releasing the encumbrance provided by the corresponding locking script of the first transaction. Furthermore, the at least one third transaction can be a single transaction with multiple transaction inputs that refer to the n transaction outputs of the first transaction. Alternatively, the at least one third transaction of the refund phase can include n separate transactions each with a transaction input that refers to different ones of the n transaction outputs of the first transaction.

Additionally or alternatively, the first party can verify the first transaction to ensure that the plurality of n cryptographic locks is based on allowed linear combinations of encrypted versions of the first plurality of n secrets generated by the first party and encrypted versions of the second plurality of n secrets generated by the second party.

Additionally or alternatively, the first party can verify the first transaction utilising data representing a combination of the encrypted versions of the second plurality of n secrets generated by the second party without revealing the second plurality of n secrets to the first party. In this case, the second party can generate the data representing a combination of the encrypted versions of the second plurality of n secrets and can send a message to the first party which includes the data representing a combination of the encrypted versions of the second plurality of n secrets.

Additionally or alternatively, the verification of the first transaction can involves operation of the form $$(k_B^{(1)}G + k_B^{(2)}G \ldots + k_B^{(n)}G) + (k_A^{(1)}G + k_A^{(2)}G \ldots + k_A^{(n)}G) \stackrel{?}{=} (k_A^{(1)} + k_B^{(1)})G + (k_A^{(2)} + k_B^{(2)})G \ldots + (k_A^{(n)} + k_B^{(n)})G,$$

where $k_A^{(1)}, k_A^{(2)}, \ldots k_A^{(n)}$ are the first plurality of n secrets, $k_B^{(1)}, k_B^{(2)}, \ldots k_B^{(n)}$ are the second plurality of n secrets, G is a point on an elliptic curve;

$k_A^{(1)}G, k_A^{(2)}G, \ldots k_A^{(n)}G$ are encrypted versions of the first plurality of n secrets; and $k_B^{(1)}G, k_B^{(2)}G, \ldots k_B^{(n)}G$ are encrypted versions of the second plurality of n secrets.

In accordance with the invention, there may be provided an electronic device which includes a processor, computer memory and a network interface device. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which.

Figure 2:
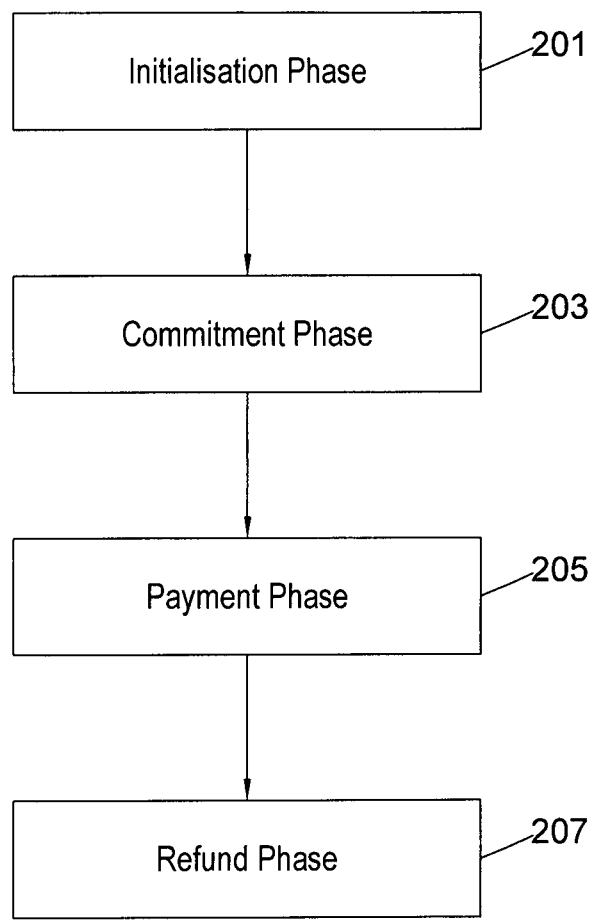
FIG. 2 is a high-level flowchart of an example method that employs communication between a first party and a second party to generate blockchain transactions for transferring digital assets of the second party in a manner that introduces randomness into the behaviour of the second party.
Figure 3A:
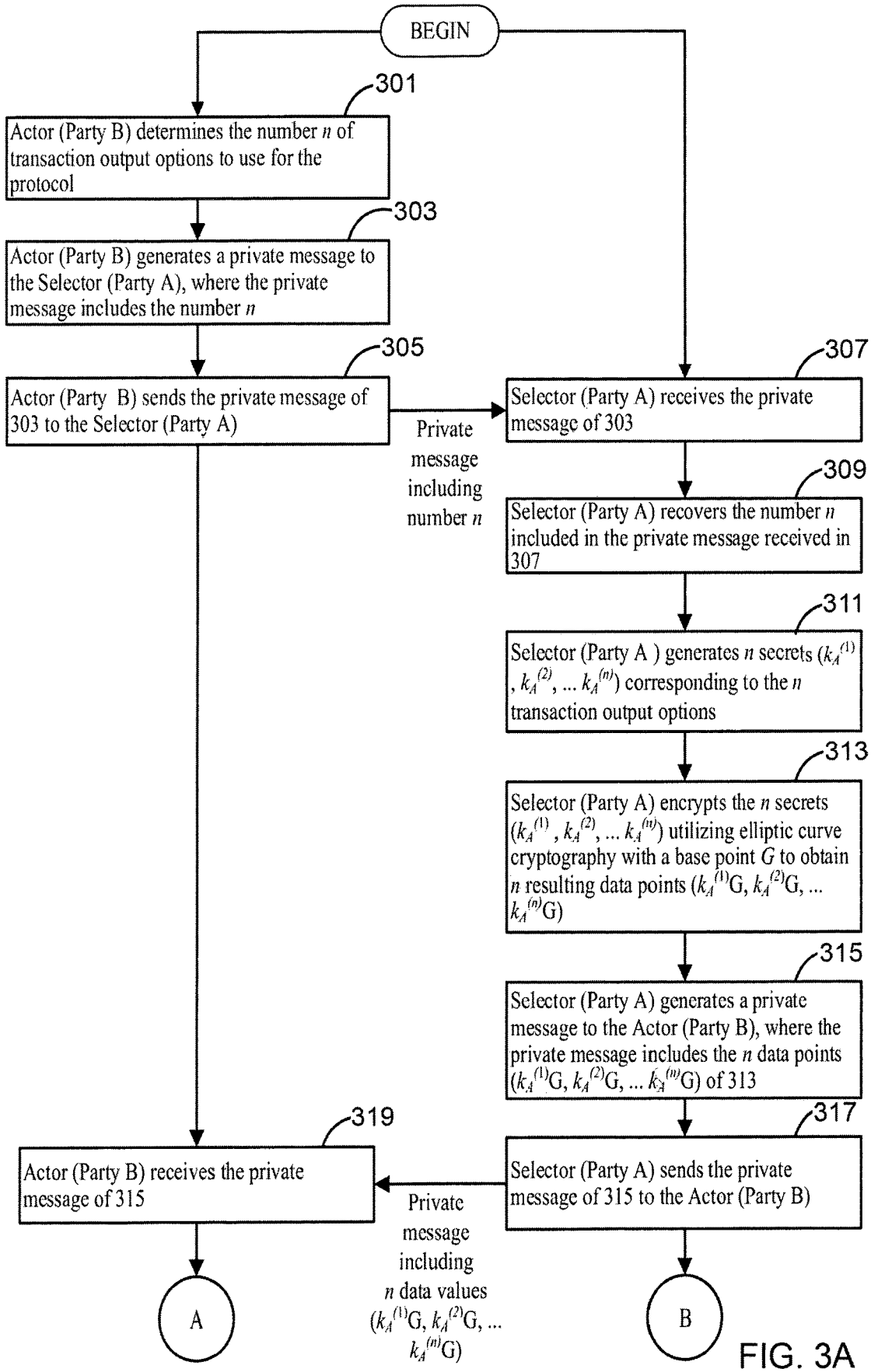
Figure 3B:
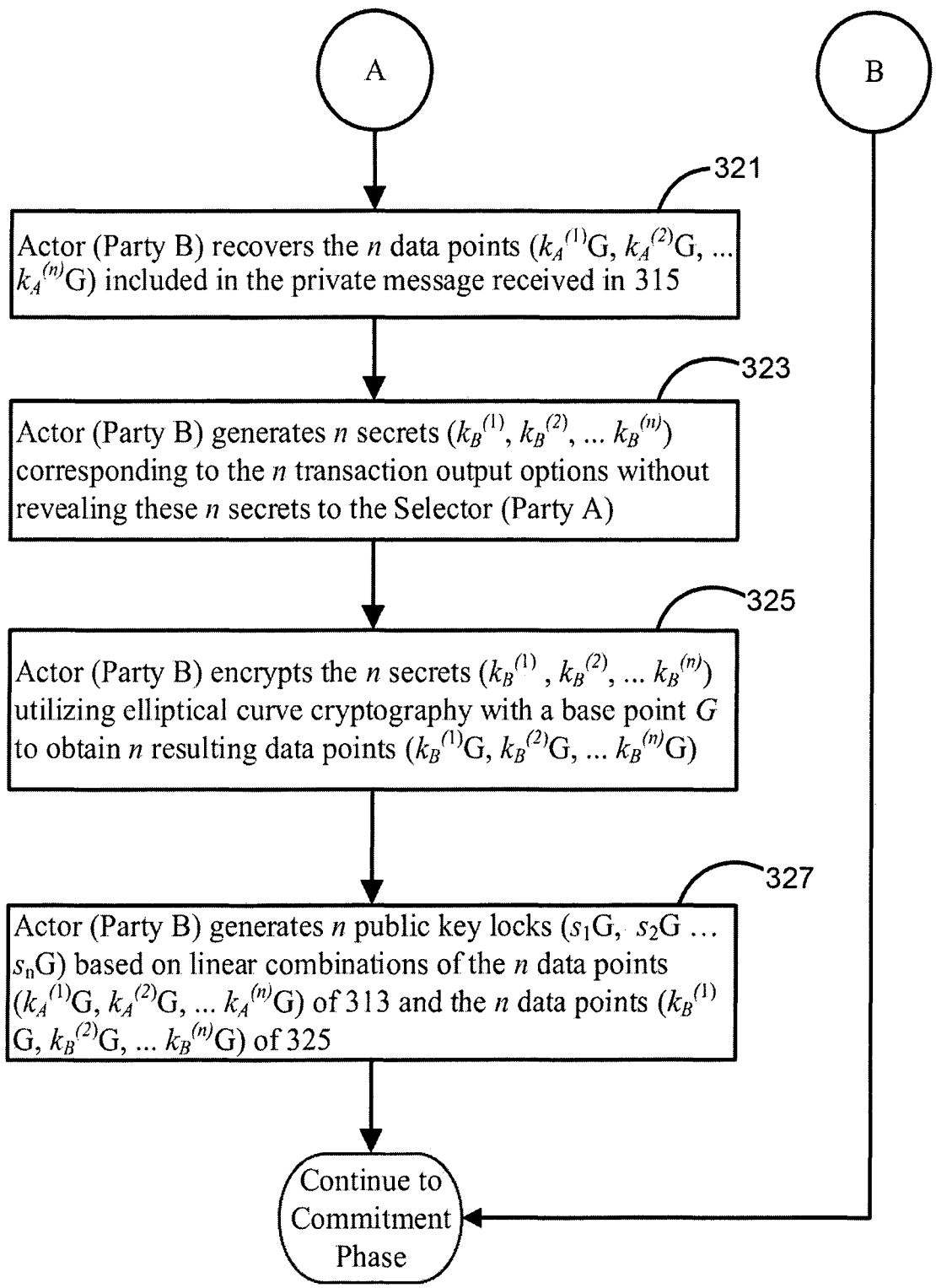

FIGS. 3A-3B, collectively, is a flow chart illustrating exemplary details of the initialisation phase of FIG. 2.

Figure 4A:
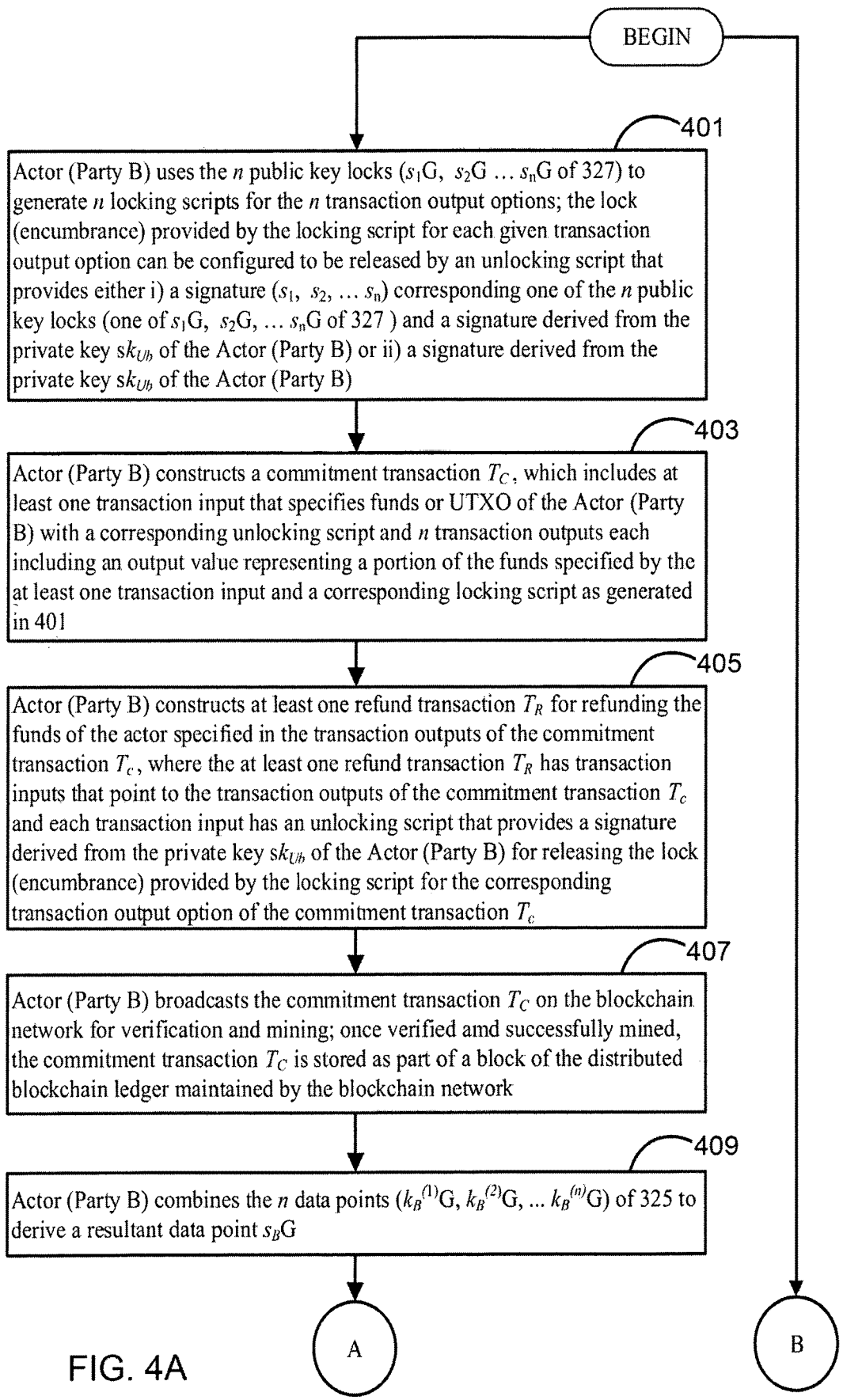
Figure 4B:
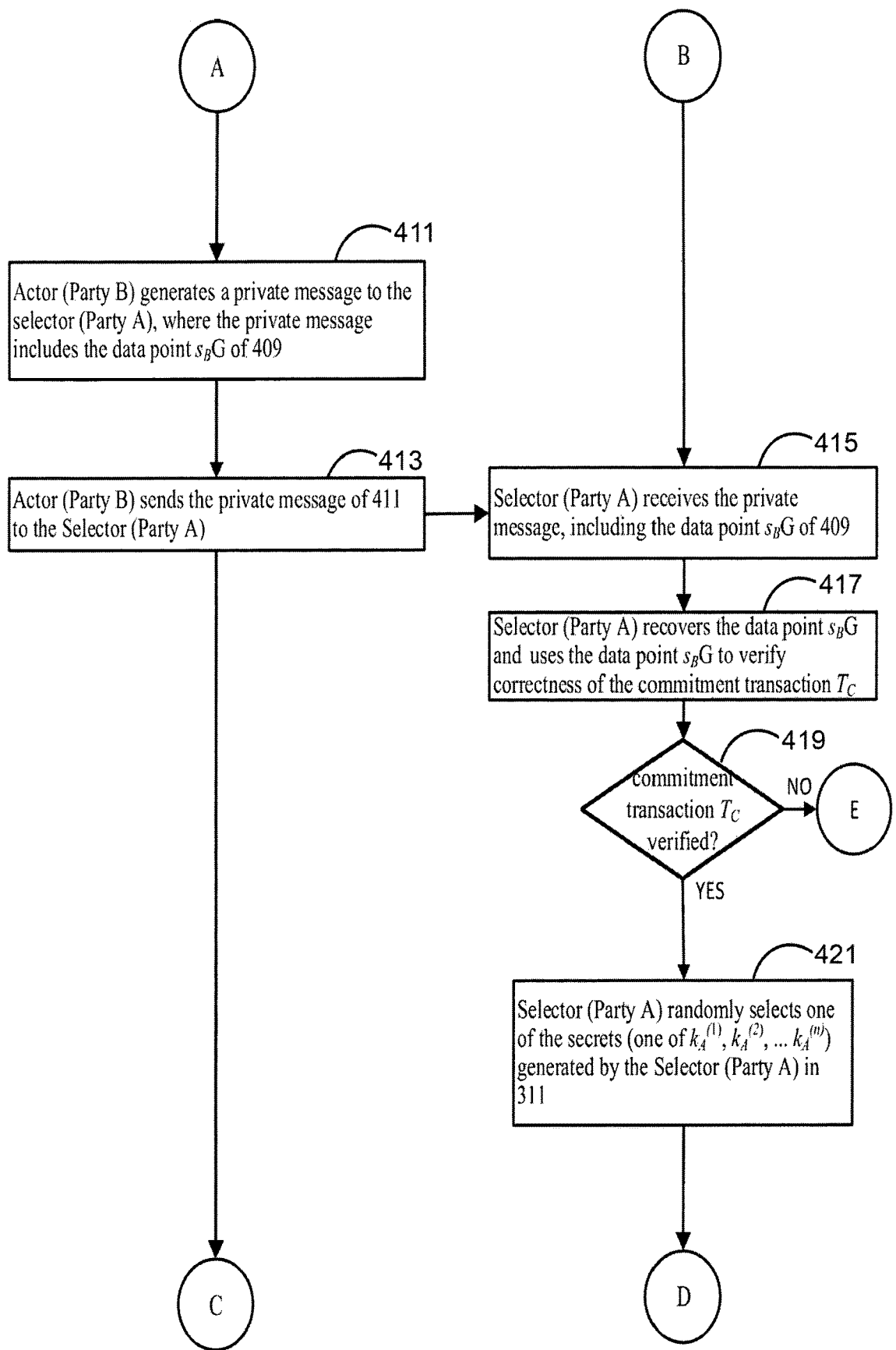
Figure 4C:
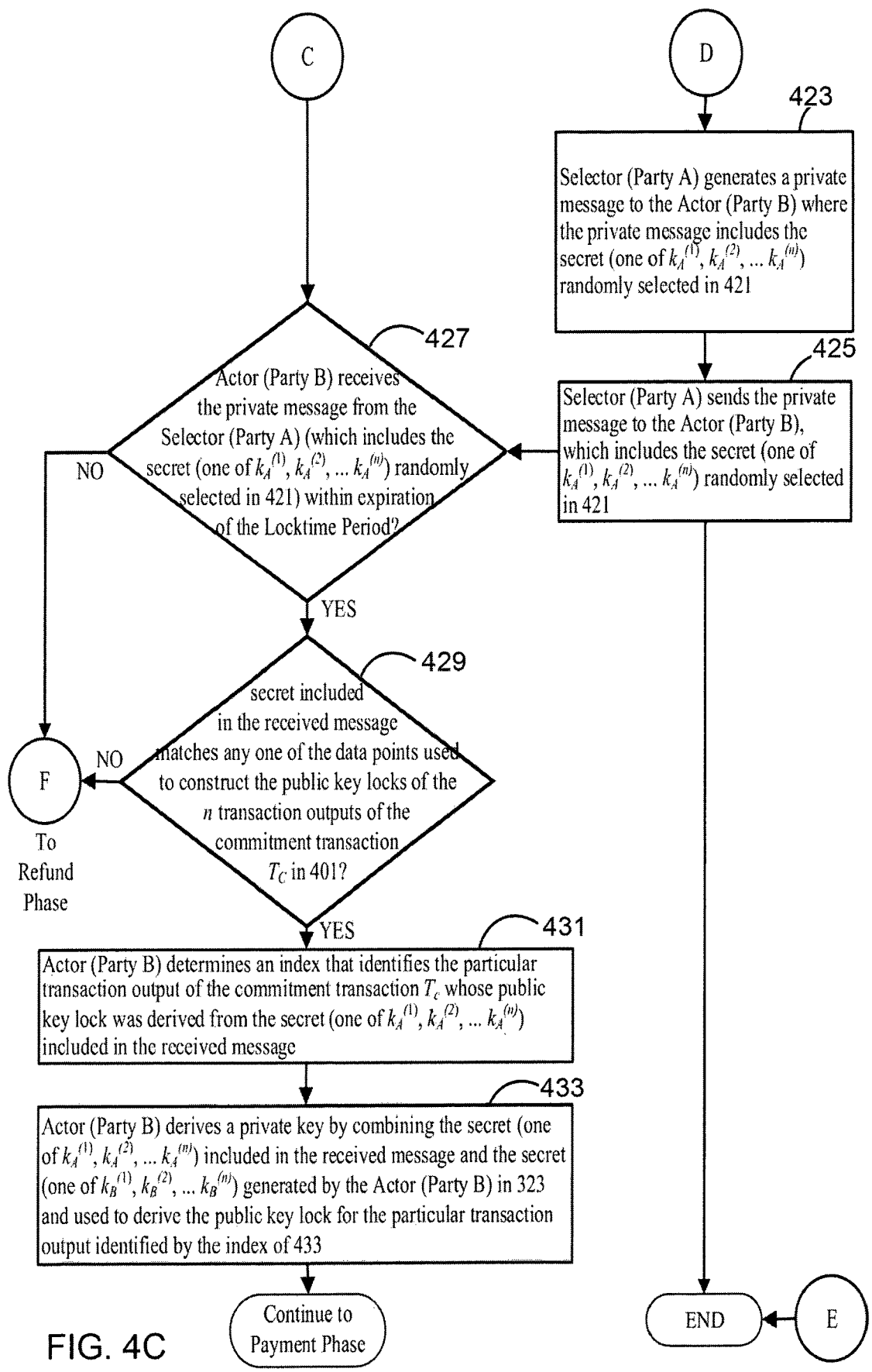

FIGS. 4A-4C, collectively, is a flow chart illustrating exemplary details of the commitment phase of FIG. 2.

Figure 5:
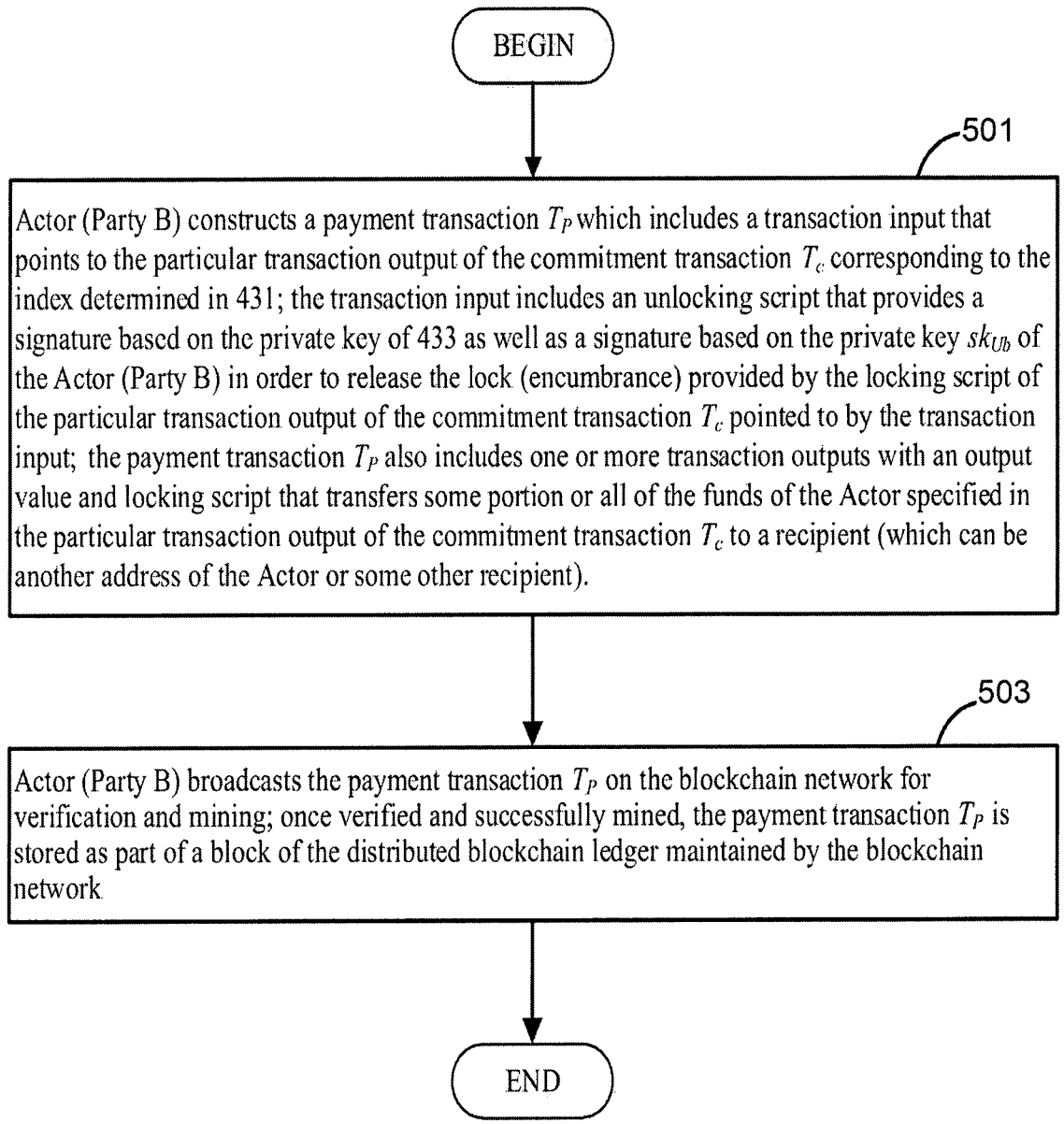

FIG. 5 is a flow chart illustrating exemplary details of the payment phase of FIG. 2.

Figure 6:
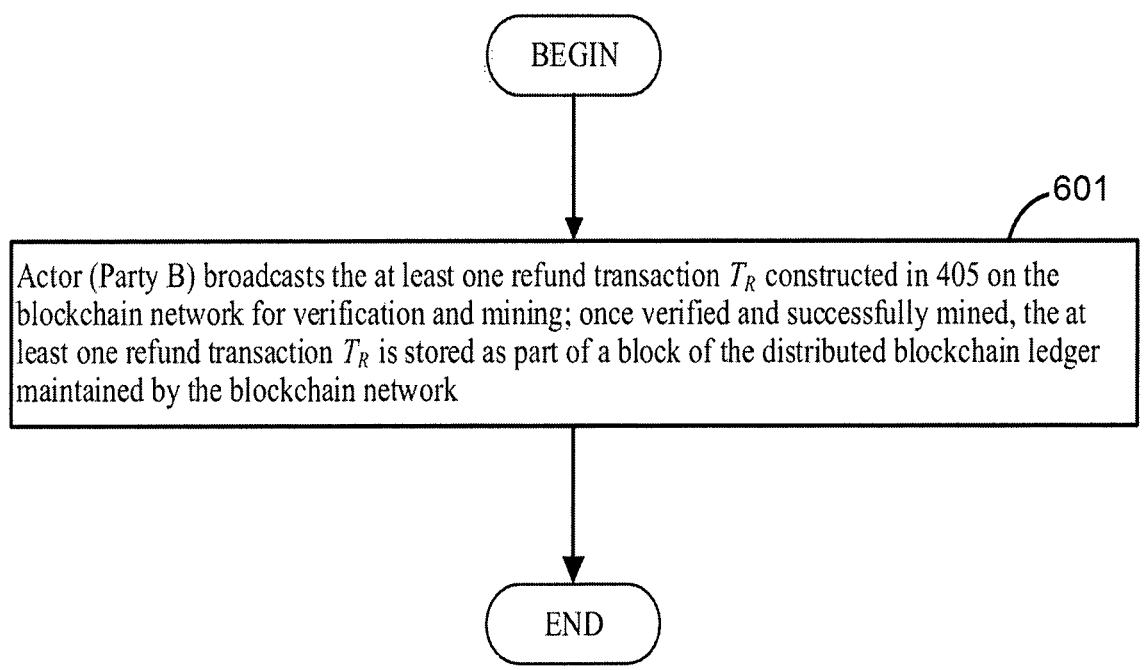

FIG. 6 is a flow chart illustrating exemplary details of the refund phase of FIG. 2.

FIG. 7 is a schematic illustration of certain operations of the methodology of FIGS. 2 to 6.

Figure 8:
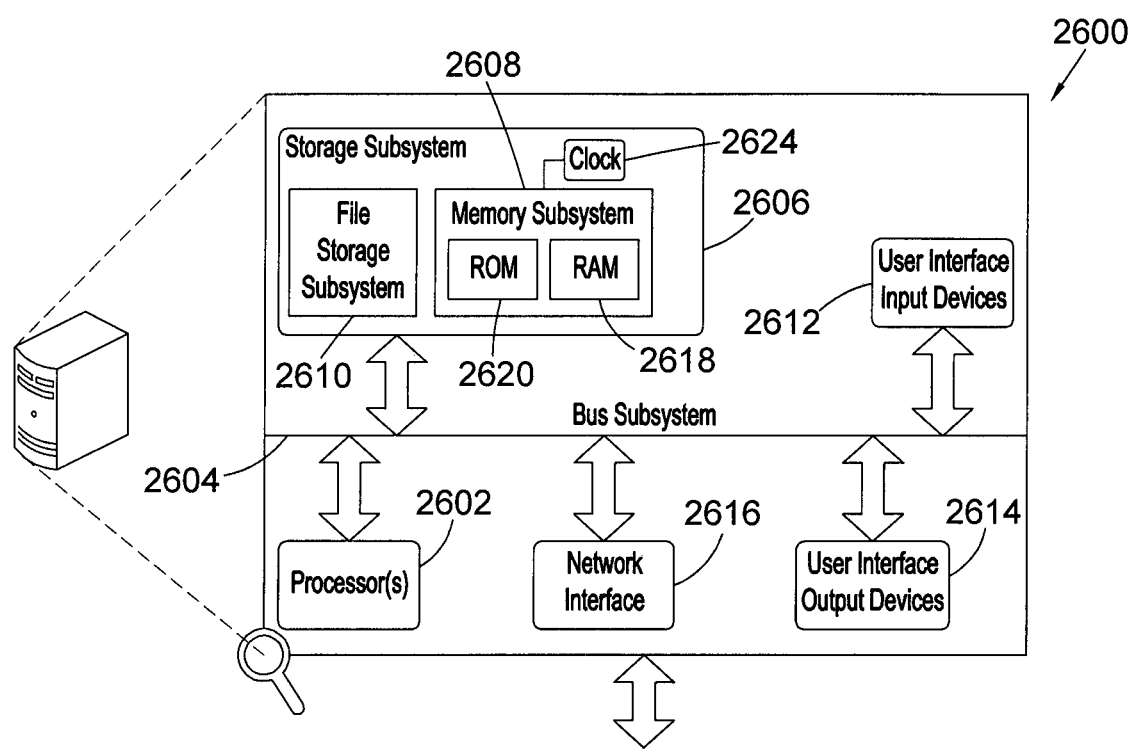

FIG. 8 illustrates a computing environment in which various embodiments can be implemented.

BLOCKCHAIN NETWORK

Figure 1A:
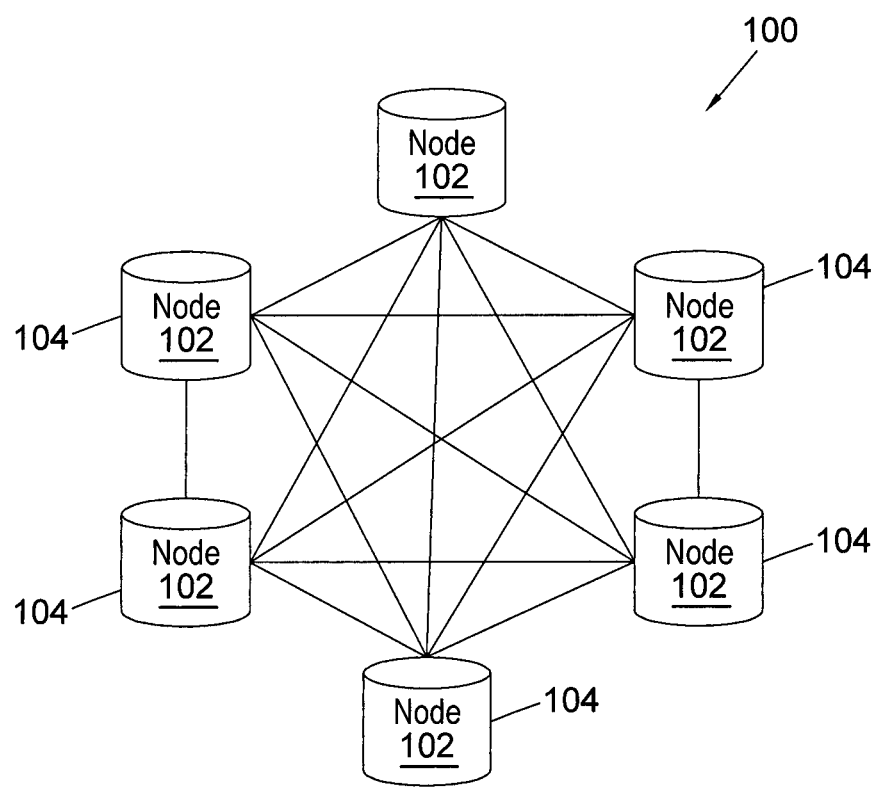
FIG. 1A illustrates a block diagram of an example blockchain network.

Reference will first be made to FIG. 1A which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

The nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Figure 1B:
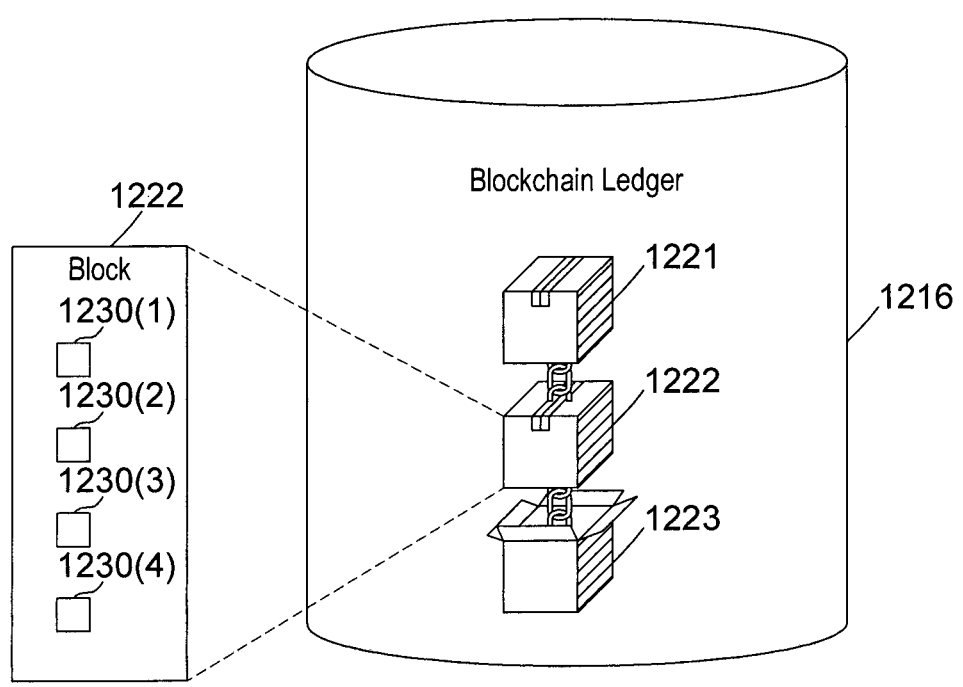
FIG. 1B is a schematic diagram of an example blockchain ledger.

The nodes 102 maintain a distributed ledger 1216 of blocks of transactions as shown in FIG. 1B. This distributed ledger 1216 is often referred to as a blockchain ledger or a blockchain. In the case of a blockchain ledger secured by proof-of-work, transactions by a node 102 affecting the blockchain ledger are verified by other nodes 102 so that the validity of the blockchain ledger is maintained. When the blockchain ledger is a proof-of-work based blockchain, blocks are also verified by checking the proof-of-work submitted with the block.

The blockchain ledger 1216 contains data corresponding to blocks of transactions (e.g., blocks 1221, 1222, 1223). For example, block 1222 includes transactions 1230(1)-(4). The blocks of the blockchain ledger 1216, except for block 1223, are cryptographically immutable in that a subsequent block relies on a value that is computed on a block when it becomes immutable and any modifications to an immutable block can be easily recognised by other blockchain nodes as an invalid block. Block 1223 is illustrated as an open box, representing storage of transactions that are possibly mutable and are not yet committed to the blockchain ledger 1216.

Each node 102 of the blockchain network 100 may store a complete copy or a partial copy of the blockchain ledger 1216. Some nodes 102 might only maintain unspent transactions, while others might maintain the entire blockchain ledger. In this manner, the blockchain ledger is a distributed ledger, as each node can have its own copy. Each node 102 of the blockchain network 100 can be configured to modify its copy of the blockchain ledger according to rules of the protocol and for all nodes that fully follow those rules, their copy should, at times, be the same as other nodes, save for some propagation time for blocks and transactions. Each node 102 can also be configured to verify blocks it receives and the transactions in those blocks. A rule of the blockchain protocol might be that a blockchain node is not to propagate a block or a transaction to other nodes if it determines that the block or transaction is invalid. With that rule, blocks and transactions that are valid and verified to be valid will propagate the blockchain network, whereas invalid ones will not.

At least some of the nodes 102 of the blockchain network 100 operate as miners 104 of the blockchain network 100. For the case where the blockchain network 100 of FIG. 1A is a proof-of-work blockchain, the miners 104 perform expensive computations in order to create the next block on the blockchain ledger. For example, the proof-of-work blockchain may require miners to solve a cryptographic problem. In Bitcoin, the miners 104 find a nonce such that a block header hashes, with SHA-256, to a number that is less than a value defined by the current difficulty. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the distributed blockchain ledger by consensus of the nodes 102. In other cases where the blockchain network 100 of FIG. 1A is a proof-of-stake blockchain, the miners 104 compete to create the next block and the winner is selected according to a deterministic (pseudo-random) process that depends on the wealth (i.e. the stake) held by the respective miners 104.

The block created by the miner 104 includes transactions which had been broadcast to the blockchain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 may participate as validating nodes, and may (or may not) operate as miners as well. Validation nodes perform validation of transactions, which can involve checking signature(s), confirming reference to valid UTXO, etc.

The example of FIG. 1A includes six nodes 102, five of which are participating as miners 104. In practice, the number of nodes 102 or miners 104 may be different. In many blockchain networks, the number of nodes 102 and miners 104 may be much greater than the number illustrated in FIG. 1A.

Figure 1C:
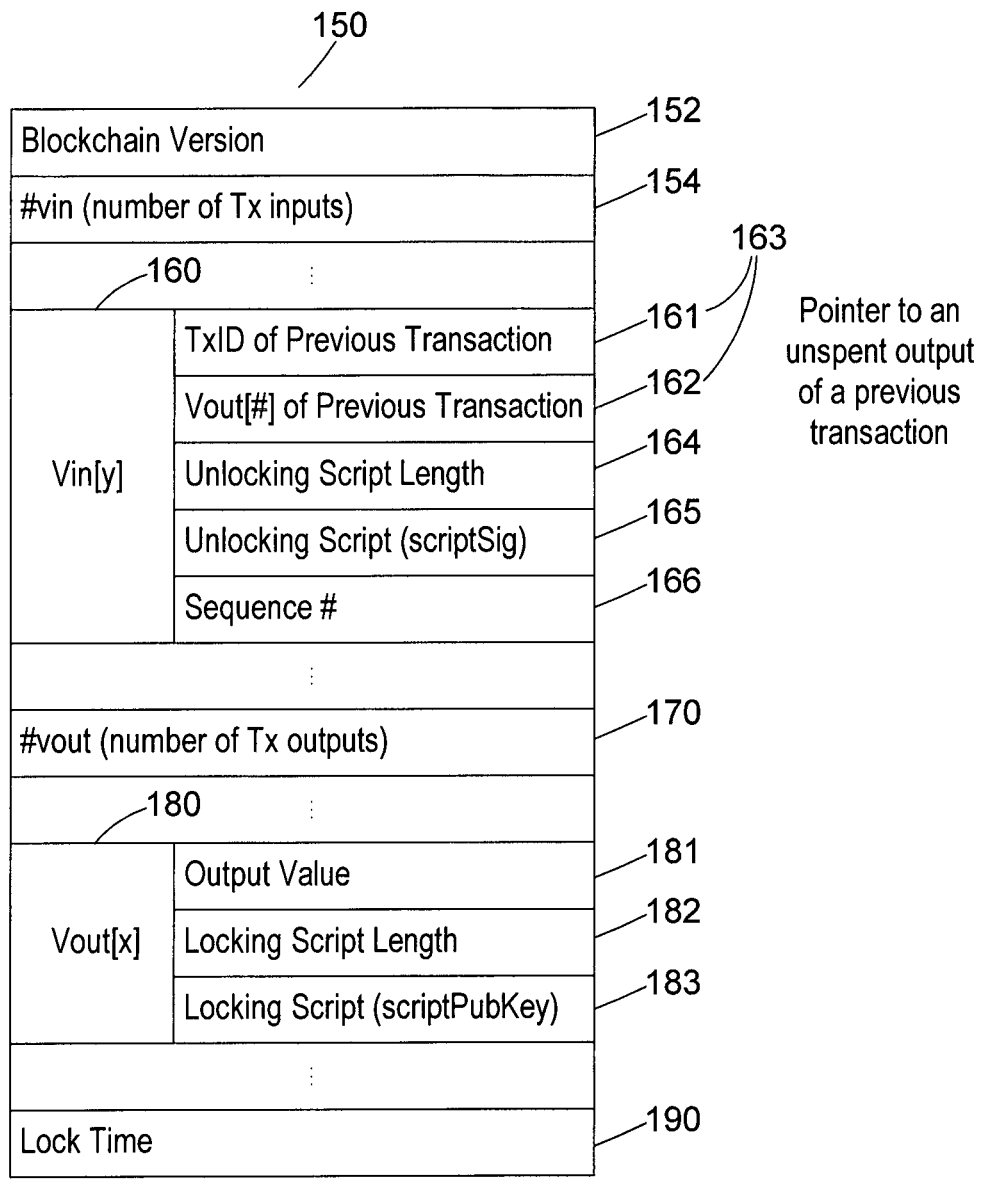
FIG. 1C illustrates an example of a blockchain transaction, specific to a Bitcoin blockchain environment.

FIG. 1C illustrates an example of a transaction 150 as might be stored in the Bitcoin blockchain. Other variations with similar functionality are possible. The data elements or fields of a transaction might be as shown in FIG. 1C and might include additional fields beyond those described in this disclosure. As shown, there is a blockchain version field 152 that has a value to indicate a blockchain protocol version of the transaction 150. A #vin field 154 indicates how many transaction inputs (explained below) are present in the transaction 150. Other fields might be present and not illustrated, but for each transaction input (illustrated here as the example Vin[y] 160), there is a set of fields including a transaction ID (TxID) 161 of a previous transaction, an index 162 to one of the outputs of that previous transaction (the transaction that supplies the transaction output to match transaction input 160), where the TxID 161 and the index 162 together form a pointer 163 that references the output of the previous transaction. As used herein, the term "previous transaction" when used in context with respect to a current or present transaction refers to a specific prior transaction (or transactions) having a transaction output that is referred to (and "spent") by the current or present transaction. In examples, the current or present transaction might be referred to as the "spending transaction".

In some blockchain implementations, there is no centralised mechanism for assigning unique TxID values and instead, there is a decentralised mechanism for generating a unique TxID for a transaction, such as by generating a hash of the contents of the transaction itself. Since a valid transaction cannot have all of the exact same content as another valid transaction, each valid transaction will have a unique hash for its TxID (aside from the astronomically low probability of a hash collision). However implemented, it is assumed herein that each transaction has a unique transaction ID. Due to the nature of hashing, once a TxID is generated from a transaction's content, none of that content can be changed and have the TxID remain valid for that transaction.

As shown in FIG. 1C, the set of fields for the transaction input Vin[y] 160 also includes an Unlocking_Script_Length field 164 indicating a length of an unlocking script that follows, an Unlocking_Script field 165 containing an unlocking script (commonly referred to as "scriptSig" in the Bitcoin protocol) for the Vin[y] 160 that "unlocks" a corresponding locking script of the transaction output pointed to by the pointer 163, and a sequence #field 166 that might be used to constrain the transaction 150.

Although FIG. 1C only explicitly shows one transaction input and one transaction output, more than one of each are possible. Following the transaction inputs, there is a #vout field 170 that indicates how many transaction outputs (as explained below) are present in the transaction 150. For each transaction output (illustrated here as the example Vout[x] 180), there is a set of fields including an output value field 181 that indicates the transaction value (e.g. number of Bitcoin) provided by this transaction output Vout[x] 180, a Locking_Script_Length field 182 indicating a length of a locking script that follows, and a Locking_Script field 183 containing a locking script (commonly referred to as "scriptPubKey" in the Bitcoin protocol) for this transaction output Vout[x] 180. As explained, the transaction value of this transaction output can be "spent" by anyone able to create a spending transaction that has a transaction input that has an unlocking script that a blockchain node will verify as TRUE when performing a verification using that unlocking script and that locking script. Other fields might follow the transaction output fields, such as a lock time field 190 that can constrain the transaction 150 to be not active prior to a specified future time or prior to a specified future block. Where each transaction input of a spending transaction points to a corresponding transaction output of a previous transaction output and the previous transaction output includes the transaction value, the transaction input need not contain a field indicating that transaction value.

Referring now to FIGS. 2-6, methods are illustrated that address the problem of "patterns formation" in blockchain transactions. In these methods, an actor (Party A) chooses a selector (Party B), who acts as an agent to randomly and blindly select an option on behalf of the actor. To remove biases on the selector's choice, the process is based on an exchange of secrets employed to lock different transaction outputs. The selector will not know which option is being chosen for the actor until the actor submits the transaction for verification and storage in the blockchain. In general, the methods can be applicable for all situations in which a user wishes to generate a random choice and instead of generating the random choice alone cooperates with an agent to make the random choice. As shown in FIG. 2, the methods can be logically partitioned into a sequence of four phases, including an initialisation phase 201, a commitment phase 203 (which involves a commitment transaction), a payment phase 205 (which involves a payment transaction), and a refund phase 207 (which involves at least one refund transaction).

In embodiments, the methods utilize digital encryption and digital signatures that employ finite field arithmetic operations on an elliptic curve. In embodiments, the elliptic curve is the set of points described by the equation $y^2 \equiv x^3 + ax + b \pmod{p}$, where $4a^3 + 27b^2 \not\equiv 0 \pmod{p}$ and p is prime. The finite field arithmetic operations can include a 'point addition' operation and a 'point doubling' operation. In the 'point addition' operation, a new point on the elliptic curve is computed as a negation of the intersection of the curve. This can be described as R=P+Q. In the 'point double' operation, a new point on the elliptic curve is computed as a point double. This can be described as R=P+P=2P. More specifically, given two points, $P(x_1, y_1)$ and $Q(x_2, y_2)$, on the elliptic curve, then $P+Q=(x_3, y_3)$, where $$x_3 = m^2 - x_1 - x_2 \bmod p, \qquad \text{Eqn. (1)}$$

$$y_3 = m(x_1 - x_3) - y_1 \bmod p, \text{ and}$$

$$m = \begin{cases} \dfrac{y_2 - y_1}{x_2 - x_1} \bmod p: \text{ if } P \neq Q \text{ (Point Addition)} \\ \dfrac{3x_1^2 + a}{2y_1} \bmod p: \text{ if } P = Q \text{ (Point Doubling)} \end{cases}$$

The finite field arithmetic operations can also include a 'point multiplication by a scalar' operation described by the equation $$nP = \underbrace{P + P + \ldots + P}_{n},$$

where it is a natural number and P is a point on the elliptic curve. Note that for the purposes of the present disclosure (but not in general) the utilisation of the digital encryption and digital signatures that employ finite field arithmetic operations on an elliptic curve is due to the homomorphic property of its private-public key relationship given as:

$$E(m+n) = E(m) + E(n), \qquad \text{Eqn. (2)}$$

where E (x) is the encryption function xG, x is a private key, G is the base point of the elliptic curve and xG the corresponding public key for x.

The initialisation phase 201 includes operations 301-327 of FIGS. 3A-3B. The commitment phase 203 includes operations 401-433 of FIGS. 4A-4C. The payment phase 205 includes operations 501-503 of FIG. 5. The refund phase 207 includes the operations of 601 of FIG. 6.

Note that the operations performed on behalf of the actor (or Party B in this example) are shown on the left side of FIGS. 3A, 3B and 4, while the operations performed by or on behalf the selector (or Party A in this example) are shown on the right side of FIGS. 3A, 3B and 4. The operations performed on behalf of the actor (or Party B in this example) can be implemented as part of a digital wallet, which can be configured to operate under program control in a fully automatic or semi-automatic manner in carrying out the functions as described herein. The operations performed on behalf of the selector (or Party A in this example) can be performed by an agent node, which can be configured to operate under program control in a fully automatic or semi-automatic manner in carrying out the functions as described herein. It is assumed that the actor (e.g., digital wallet of the actor) and selector (e.g., agent node of the selector) can communicate messages and other forms of data to one another via networked data communication, which can possibly involve the blockchain network 100 or other suitable data communication networks.

FIGS. 3A-3B illustrate exemplary details of the initialisation phase 201. It is assumed that the actor (party B) and selector (Party A) agree on an elliptic curve and a set of associated parameters including a base point G on the elliptic curve, a large prime order $n_c$ for the elliptic curve, and a maximum key size q. For example, the standardised elliptic curve used in Bitcoin (secp256k1) can be selected. Furthermore, it is assumed that a private key and public key pair ($sk_{Ub}$, $sK_{Ub}$) belongs to the actor (Party B), and a private key and public key pair ($sk_{Ua}$, $sK_{Ua}$) belongs to the selector (Party A).

At operation 301, the actor (Party B) determines the number n of transaction output options to use for the method.

At operation 303, the actor (Party B) generates a private message to the selector (Party A), where the private message includes the number n. The private message can be encrypted using the public key $sK_{Ua}$ of the selector (Party A).

At operation 305, the actor (Party B) sends the private message of 303 to the selector (Party A).

At operations 307, the selector (Party A) receives the private message of 303.

At operation 309, the selector (Party A) recovers the number n included in the private message received in 307. In order to recover the number n from the private message encrypted using the public key $sK_{Ua}$ of the selector (Party A), the selector (Party A) can decrypt the private message using the private key $sk_{Ua}$ of the selector (Party A).

At operation 311, the selector (Party A) generates n secrets ($k_A^{(1)}$, $k_A^{(2)}$, ... $k_A^{(n)}$) corresponding to the n transaction output options. In embodiments, the n secrets ($k_A^{(1)}$, $k_A^{(2)}$, ... $k_A^{(n)}$) can be selected within the interval [1, $n_c-1$] where $n_c$ is the large prime order of the elliptic curve.

At operation 313, the selector (Party A) encrypts the n secrets ($k_A^{(1)}$, $k_A^{(2)}$, ... $k_A^{(n)}$) utilizing elliptic curve cryptography with the base point G on the elliptic curve to obtain n resulting data points ($k_A^{(1)}G$, $k_A^{(2)}G$, ... $k_A^{(n)}G$). In this operation, the resulting n data points ($k_A^{(1)}G$, $k_A^{(2)}G$, ... $k_A^{(n)}G$) can be derived from point multiplication by a scalar as described above where the value of the secret is the scalar used to derive the respective data point.

At operation 315, the selector (Party A) generates a private message to the actor (Party B), where the private message includes the n data points ($k_A^{(1)}G$, $k_A^{(2)}G$, ... $k_A^{(n)}G$) of 313. The private message can be in encrypted using the public key $sK_{Ub}$ of the actor (Party B).

At operation 317, the selector (Party A) sends the private message of 315 to the actor (Party B).

At operation 319, the actor (Party B) receives the private message of 315.

At operation 321, the actor (Party B) recovers the n data points ($k_A^{(1)}G$, $k_A^{(2)}G$, ... $k_A^{(n)}G$) included in the private message received in 315. In order to recover the n data points ($k_A^{(1)}G$, $k_A^{(2)}G$, ... $k_A^{(n)}G$) included in the private message encrypted using the public key $sK_{Ub}$ of the actor (Party B), the actor (Party B) can decrypt the private message using the private key $sk_{Ub}$ of the actor (Party B).)

At operation 323, the actor (Party B) generates n secrets $(k_B^{(1)}, k_B^{(2)}, \ldots k_B^{(n)})$ corresponding to the n transaction output options. In embodiments, the n secrets $(k_B^{(1)}, k_B^{(2)}, \ldots k_B^{(n)})$ can be selected within the interval $[1, n_c-1]$ where $n_c$ is the large prime order of the elliptic curve. Note that the n secrets $(k_B^{(1)}, k_B^{(2)}, \ldots k_B^{(n)})$ generated by the actor (Party B) in 323 are not revealed to the selector (Party A) in the subsequent operations of the method.

At operation 325, the actor (Party B) encrypts the n secrets $(k_B^{(1)}, k_B^{(2)}, \ldots k_B^{(n)}$ utilizing elliptic curve cryptography with the base point G on the elliptic curve to obtain n resulting data points $(k_B^{(1)}G, k_B^{(2)}G, \ldots k_B^{(n)}G)$. In this operation, the resulting n data points $(k_B^{(1)}G, k_B^{(2)}G, \ldots k_B^{(n)}G)$ can be derived from point multiplication by a scalar as described above where the value of the secret is the scalar used to derive the respective data point.

At operation 327, the actor (Party B) generates n public key locks $(s_1G, s_2G, \ldots s_nG)$ for each one of the n transaction output options based on linear combinations of the n data points $(k_A^{(1)}G, k_A^{(2)}G, \ldots k_A^{(n)}G)$ of 313 and the n data points $(k_B^{(1)}G, k_V^{(2)}G, \ldots k_B^{(n)}G)$ of 325. Each one of the n public key locks is generated by summing one data point representing an encrypted secret generated by the actor (Party B) with one data point representing an encrypted secret generated by the selector (party A). In embodiments, the n public key locks $(s_1G, s_2G, \ldots s_nG)$ can be derived as follows:

$$\text{transaction output option 1: } s_1G=(k_A^{(1)}G+k_B^{(1)}G)=(k_A^{(1)}+k_B^{(1)})G \quad \text{Eqn. (3a)}$$

$$\text{transaction output option 2: } s_2G=(k_A^{(2)}G+k_B^{(2)}G)=(k_A^{(2)}+k_B^{(2)})G \quad \text{Eqn. (3b)}$$

$$\ldots$$

$$\text{transaction output option n: } s_nG=(k_A^{(n)}G+k_B^{(n)}G)=(k_A^{(n)}+k_B^{(n)})G \quad \text{Eqn. (3n)}$$

Note that equality obtained for the last two items for each option is based on the homomorphic properties of the group. Also note that to simplify the description, the embodiment described above derives the public key lock for each transaction output option i (belonging from 1 to n) based on a linear combination of the data point $k_A^{(1)}G$ and the data point $k_B^{(1)}G$. Note that any combination of data point pairs, with one taken from the group generated by the actor (Party B) and the other one taken from group generated by the selector (Party A), can be combined to form the public key locks for the n transaction output option as long as different combinations of data points from the two groups are used in the different transaction outputs and no data point is used twice.

Note that by generating the n public key locks $(s_1G, s_2G, \ldots s_nG)$ for each one of the n transaction output options based on linear combinations of the n data points $(k_A^{(1)}G, k_A^{(2)}G, \ldots k_A^{(n)}G)$ of 313 and the n data points $(k_B^{(1)}G, k_B^{(2)}G, \ldots k_B^{(n)}G)$ of 325 and not revealing the) secrets $k_B^{(1)}, k_B^{(2)}, \ldots k_B^{(n)}$ generated by the actor (Party B) in 323 to the selector (Party A), the selector (Party A) will not know which one of secrets $k_A^{(1)}, k_A^{(2)}, \ldots k_A^{(n)}$ generated by the selector (Party A) in 311 has been used to derive each one of the n public key locks. Furthermore, the selector (Party A) cannot reconstruct the n public key locks or generate unlocking scripts that release any one of n public key locks, which allows the actor (party B) alone to generate unlocking scripts that release any one of n public key locks as describe below.

After 327, the operations of the actor (Party B) and the selector (Party A) in the initialisation phase can end.

FIGS. 4A-4C illustrate exemplary details of the commitment phase 203.

At operation 401, the actor (Party B) uses the n public key locks $(s_1G, s_2G, \ldots s_nG)$ of 327 and the public key $sK_{Ub}$ of the actor (Party B) to generate n locking scripts for the n transaction output options. The lock (encumbrance) provided by the locking script for each given transaction output option can be configured to be released by an unlocking script that provides either i) a signature (one of $s_1, s_2, \ldots s_n$) corresponding to one of the n public key locks (one of $s_1G, s_2G \ldots s_nG$ of 327) and a signature derived from the private key $sk_{Ub}$ of the actor (Party B), or ii) a signature derived from the private key $sk_{Ub}$ of the actor (Party B).

In embodiments, the n locking scripts for each of the n transaction output options can use the op_if and op_else opcodes of the Bitcoin's Scripting language as follows:

```
OP_IF
    OP_2 <pubkey sK_Ub> <pubkey s_1G> OP_2 OP_CHECKMULTISIG
OP_ELSE
    <EXPIRY TIME T1> OP_CHECKSEQUENCVERIFY OP_DROP
<pubkey sK_Ub> OP_CHECKSIG
OP_ENDIF
```

The first part of the locking script (the IF) is an (2-of-2) m-of-n multisig script that requires a signature (one of $s_1, s_2, \ldots s_n$) and a signature derived from the private key $sk_{Ub}$ of the actor (Party B). The unlocking script for this case (which is part of the payment transaction $T_P$ as described below) is:

OP_0<sig $sk_{Ub}$> <sig $s_1$> OP_TRUE

This unlocking script would unlock the first option (case i) of the locking script of the respective transaction output of the commitment transaction $T_C$ as it provides the necessary signatures that is the signature (one of $s_1, s_2, \ldots s_n$) for the respective transaction output and a signature derived from the private key $sk_{Ub}$ of the actor (Party B).

The second part of the locking script (the ELSE) is the standard unlocking script if the signature for a public key (in this case, the public key $sK_{Ub}$ of the actor) is required. The locking time value T1 must be chosen so that the funds can be redeemed by the actor after some point in the future if the protocol is aborted (i.e. the selector does not send the secret value to the actor). The locking time parameter is defined using the opcode OP_CHECKSEQUENCEVERIFY. Note that the OP_CHECKSEQUENCEVERIFY was introduced in BIP112; it allows execution pathways of a script to be restricted based on the age of the output being spent (https://github.com/bitcoinibipsibloblmasteribip-0112.mediawiki).

The unlocking script for this case (which is part of the refund transaction $T_R$ as described below) is:

<T1> <sig $sk_{Ub}$> OP_FALSE

This unlocking script would unlock the second option (case ii) of the locking script of the respective transaction output of the commitment transaction $T_C$ as it provides the necessary signature the signature derived from the private key $sk_{Ub}$ of the actor (Party B).

At operation 403, the actor (Party B) constructs a commitment transaction $T_C$, which includes one or more transaction inputs that specify funds or UTXO of the actor (Party B) and n transaction outputs each including an output value (which is some portion of the funds of the actor specified by the one or more transaction inputs) with one of the n locking scripts generated in 401 for locking the output value of the transaction output. Note that the funds of the actor (Party B) as specified by the one or more transaction inputs of the commitment transaction $T_C$ must be sufficient to cover the output values of the n transaction outputs of the commitment transaction $T_C$.

At operation 405, the actor (Party B) constructs at least one refund transaction $T_R$ for refunding the funds of the actor specified in the transaction outputs of the commitment transaction $T_c$ to the same address (or another address) of the actor. The at least one refund transaction $T_R$ has transaction inputs that point to the transaction outputs of the commitment transaction $T_c$, where each transaction input has an unlocking script that provides a signature derived from the private key $sk_{Ub}$ of the actor (Party B) for releasing the lock (encumbrance) provided by the locking script for the corresponding transaction output option of the commitment transaction $T_C$. This signature satisfies case ii) of the locking script of corresponding transaction output option of the commitment transaction $T_C$. The at least one refund transaction $T_R$ can also include one or more transaction outputs with an output value and locking script that transfers the funds of the actor (Party B) specified in one or more transaction outputs of the commitment transaction $T_c$ to the same address (or another address) of the actor.

In embodiments, the signature derived from the private key $sk_{Ub}$ of the actor (Party B) for a refund transaction $T_R$ can be generated using elliptic curve cryptography as follows. Parts of the refund transaction $T_R$ are hashed to form a message m and a random number k is chosen where $0<k<q$. The signature can be produced with two parts (R, S) as follows:

$$R = k \times G, \qquad \text{Eqn. (4a)}$$

$$S = k^{-1}(m+xr) \bmod n_c, \qquad \text{Eqn. (4b)}$$

where x is the private key $sk_{Ub}$ of the actor, and
$k^{-1}$ is the multiplicative inverse of k mod $n_c$
such that $k^{-1}k \equiv 1 \bmod n_c$ In embodiments, the actor (Party B) can construct a single refund transaction $T_R$ with n transaction inputs that point to the n different transaction outputs of the commitment transaction $T_c$. In this case, the output value(s) of the transaction output(s) for the single refund transaction $T_R$ cannot exceed the total funds of the actor specified in the n different transaction outputs of the commitment transaction $T_c$.

In other embodiments, the actor (Party B) can construct n refund transactions $T_R$ with respective transaction inputs that point to the n different transaction outputs of the commitment transaction $T_c$. In this case, the output value(s) of the transaction output(s) for the n refund transactions $T_R$ cannot exceed the total funds of the actor specified in the n different transaction outputs of the commitment transaction $T_c$.

At operation 407, the actor (Party B) broadcasts the commitment transaction $T_C$ of 403 on the blockchain network 100 for verification and mining. Once verified and successfully mined, the commitment transaction $T_C$ is stored as part of a block of the distributed blockchain ledger maintained by the blockchain network 100.

In embodiments, the verification of the commitment transaction $T_C$ based on elliptic curve cryptography can involve hashing parts of the commitment transaction $T_C$ to form a message m. The public key $sK_{Ub}$ of the actor (Party B) and a two-part signature (R, S) is provided with the commitment transaction $T_C$. The two-part signature (R, S) can be verified as follows:

Calculate $v = S^{-1} m \times G + S^{-1} R \times y$
where $S^{-1}$ is the multiplicative inverse of S mod q
such that $S^{-1}S \equiv 1 \bmod n_c$, and
y is the public key $sK_{Ub}$ of the actor.
Determine that the two-part signature (R, S) is valid
if and only if $v == R$ The commitment transaction $T_C$ can be verified if and only of the two-part signature (R, S) is determined to be valid. Note that the elliptic curve has a prime order $n_c$, therefore the mod $n_c$ part of $S^{-1}$ goes away when the elliptic curve point is multiplied with the base point G.

At operation 409, the actor (Party B) combines the n data points $(k_B^{(1)}G, k_B^{(2)}G, \ldots k_B^{(n)}G)$ of 325 to derive a resultant data point $s_B G$ as follows $s_B G = k_B^{(1)}G + k_B^{(2)}G \ldots + k_B^{(n)}G$. In this operation, the data point $s_B G$ can be derived from a sequence of point addition operations involving the n data points of 325.

At operation 411, the actor (Party B) generates a private message to the selector (Party A), which includes the data point $s_B G$ of 409. The private message can be in encrypted form using the public key $sK_{Ua}$ of the selector (Party A).

At operations 413, the actor (Party B) sends the private message of 411 to the selector (Party A).

At operation 415, the selector (Party A) receives the private message, which includes the data point $s_B G$ of 409.

At operation 417, the selector (Party A) recovers the data point $s_B G$ of 409 and uses the data point $s_B G$ to verify correctness of the commitment transaction Tu. In order to recover the data point $s_B G$ from the private message encrypted using the public key $sK_{Ua}$ of the selector (Party A), the selector (Party A) can decrypt the private message using the private key $sk_{Ua}$ of the selector (Party A).

In embodiments, the verification of 417 involves determining whether the sum $s_B G \; s_A G$ is equal to the sum of $(k_A^{(1)}+k_B^{(1)})G+(k_A^{(2)}+k_B^{(2)})G \ldots +(k_A^{(n)}+k_B^{(n)})G$. In the case, $s_A G$ can be determined from the n data points $k_A^{(1)}G, k_A^{(2)}G, \ldots k_A^{(n)}G$ of 313 as $s_A G = k_A^{(1)}G + k_A^{(2)}G \ldots + k_A^{(n)}G$. Due to the homomorphic properties of the encryption scheme using the elliptic curve, this verification operation can be represented as:

$$(k_B^{(1)}G + k_B^{(2)}G \ldots + k_B^{(n)}G) + (k_A^{(1)}G + k_A^{(2)}G \ldots + k_A^{(n)}G) \stackrel{?}{=} (k_A^{(1)} + k_B^{(1)})G + (k_A^{(2)} + k_B^{(2)})G \ldots + (k_A^{(n)} + k_B^{(n)})G. \qquad \text{Eqn. (5)}$$

The selector (Party A) can retrieve the data points for the RHS of Eqn. (5) from the locking scripts of the n transaction output options of the commitment transaction $T_c$, and then can combine these data points together as provided in the RHS of Eqn. (5). Such verification can ensure that the actor (Party B) has complied with the protocol and generated n public key locks $(s_1 G, s_2 G, \ldots s_n G)$ that are part of the corresponding n locking scripts for the n transaction output options of the commitment transaction $T_C$, where the n public key locks $(s_1 G, s_2 G, \ldots s_n G)$ are based on allowed linear combinations of the n data points $(k_A^{(1)}G, k_A^{(2)}G, \ldots k_A^{(n)}G)$ of 313 and the n data points $(k_B^{(1)}G, k_B^{(2)}G, \ldots k_B^{(n)}G)$ of 325.

At operation 419, the selector (Party A) evaluates the result of the determination of 417 to ascertain whether or not the commitment transaction $T_C$ is verified. If so, the operations continue to 421-433 as described below; otherwise, the operations of 421-433 are bypassed.

At operation 421, the selector (Party A) randomly selects one of the secrets (one of $k_A^{(1)}, k_A^{(2)}, \ldots k_A^{(n)}$) generated by the selector (Party A) in 311.

At operation 423, the selector (Party A) generates a private message to the actor (Party B) where the private message includes the secret (one of $k_A^{(1)}, k_A^{(2)}, \ldots k_A^{(n)}$) randomly selected in 421. The private message can be encrypted using the public key $sK_{Ub}$ of the actor (Party B).

At operation 425, the selector (Party A) sends the private message to the actor (Party B), which includes the secret (one of $k_A^{(1)}, k_A^{(2)}, \ldots k_A^{(n)}$) randomly selected in 421 and the operations of the selector (Party A) in the commitment phase ends.

At operation 427, the actor (Party B) receives the private message from the selector (Party A) (which includes the secret (one of $k_A^{(1)}, k_A^{(2)}, \ldots k_A^{(n)}$) randomly selected in 421) and determines whether the private message has been received within expiration of the Locktime Period of the commitment transaction $T_C$. If not, the operations of the actor (Party B) continue to the refund phase (FIG. 6) as shown. If so, the operations continue to 429. In order to recover the secret included in the private message encrypted using the public key $sK_{Ub}$ of the actor (Party B), the actor (Party B) can decrypt the private message using the private key $sk_{Ub}$ of the actor (Party B).

At operation 429, the actor (Party B) determines whether the secret (one of $k_A^{(1)}, k_A^{(2)}, \ldots k_A^{(n)}$) included in private message received from the selector (Party A) matches any one of the data points of 321 that are used construct the public key locks of the n transaction outputs of the commitment transaction $T_C$ in 401. Such operations can involve encrypting the secret (one of $k_A^{(1)}, k_A^{(2)}, \ldots k_A^{(n)}$) utilizing elliptic curve cryptography with the base point G on the elliptic curve to obtain a resulting data point (this is similar to operation 313 as described above) and determining whether the resulting data point matches any one of the data points received from the selector (Party A) in 319 and recovered by the actor (Party B) in 321. If this determination fails, the operations of the actor (Party B) can continue to the refund phase (FIG. 6) as shown. If this determination succeeds, the operations continues to 431 and 433.

At operation 431, the actor (Party B) utilizes the matching correspondence between the secret (one of $k_A^{(1)}, k_A^{(2)}, \ldots k_A^{(n)}$) included in private message received from the selector (Party A) and a particular data point of 321 as determined in 429 to derive an index that identifies the particular transaction output of the commitment transaction $T_c$ whose public key lock was derived from the secret (one of $k_A^{(1)}, k_A^{(2)}, \ldots k_A^{(n)}$) included in the received message. For example, if $k_A^{(2)}$ is the randomly selected secret included in private message and $k_A^{(2)}$ was used to construct the public key lock $s_2G$ of the transaction output 2 of the commitment transaction $T_c$ as illustrated in the example of Equation 3(b), the index derived in 431 would refer to transaction output 2 of the commitment transaction $T_c$.

At operation 433, the actor (Party B) derives a private key by adding the secret (one of $k_A^{(1)}, k_A^{(2)}, \ldots k_A^{(n)}$) included in the received message and the secret (one of $k_B^{(1)}, k_A^{(2)}, \ldots k_B^{(m)}$) generated by the actor (Party B) in 323 and used to derive the public key lock for the particular transaction output identified by the index of 431, and the operations of the actor (Party B) continue to the payment phase (FIG. 5) as shown.

Note that the random secret selected by the selector (Party A) influences the actor's behaviour in constructing the private key in 433 for the payment transaction as described below, without the selector (Party A) knowing the effect of this random secret selection. The effect can be discovered only after the payment transaction has been submitted by the actor (Party B) on the blockchain. This set-up guarantees that the choice between the n transaction output options of the commitment transaction is completely random and unbiased. Also note that despite the selector (Party A) having access to the additional information about the sum of the actor's secrets (e.g., $s_BG=k_B^{(1)}G+k_B^{(2)}G \ldots +k_B^{(m)}G$), the selector (Party A) will not be able to infer which secret unlocks which one of the n transaction output options of the commitment transaction $T_C$. Moreover, since the selector (Party A) does not know the actor's secrets $k_B^{(1)}, k_B^{(2)}, \ldots, k_B^{(m)}$, the selector (party A) will not be able to steal funds from the actor by submitting the payment transaction $T_P$ of the payment phase as the payment transaction $T_P$ also requires the requisite signature of the actor (derived from one of $s_1, s_2, \ldots s_n$) of the actor, which the selector is not able to reproduce.

FIG. 5 illustrates exemplary details of the payment phase 205. The selector (Party A) need not take part in the payment phase 205 as evident from the operations of FIG. 5. Note that operations of the actor (Party A) in the payment phase 205 are performed in response to the actor (Party B) receiving a private message from the selector (Party A), which includes one of the secrets (one of $k_A^{(1)}, k_A^{(2)}, \ldots k_A^{(n)}$) generated by the selector (Party A) that corresponds to a randomly-selected one of then transaction output options of the commitment transaction $T_C$) within expiration of the Locktime period of the commitment transaction $T_C$.

At operation 501, the actor (Party B) constructs a payment transaction $T_P$ which includes a transaction input that points to the particular transaction output of the commitment transaction $T_c$ corresponding to the index determined in 431. The transaction input also includes an unlocking script that provides a signature based on the private key of 433 as well as a signature based on the private key $sk_{Ub}$ of the Actor (Party B) that releases the lock (encumbrance) provided by the locking script of the particular transaction output of the commitment transaction $T_c$ pointed to by the transaction input. This signature satisfies case i) of the locking script of corresponding transaction output option of the commitment transaction $T_C$. The payment transaction $T_P$ also includes one or more transaction outputs with an output value and locking script that transfers some portion or all of the funds of the actor specified in the particular transaction output of the commitment transaction $T_c$ to a recipient (which can be another address of the actor or some other recipient).

In embodiments, the signature based on the private key of 433 and the signature derived from the private key $sk_{Ub}$ of the actor (Party B) for a payment transaction $T_P$ can be generated using elliptic curve cryptography as follows. Parts of the payment transaction $T_P$ are hashed to form a message m and a random number k is chosen where 0<k<q. The signature based on the private key of 433 can be produced with two parts (R1, S1) as follows:

$$R1=k \times G, \qquad \text{Eqn. (6a)}$$

$$S1=k^{-1}(m+x1R1) \bmod n_c, \qquad \text{Eqn. (6b)}$$

where x1 is the private key of 433, and
$k^{-1}$ is the multiplicative inverse of k mod $n_c$
such that $k^{-1}k \equiv 1 \bmod n_c$ The signature derived from the private key $sk_{Ub}$ of the actor (Party B) can be produced with two parts (R2, S2) as follows:

$$R2=k \times G, \qquad \text{Eqn. (7a)}$$

$$S2=k^{-1}(m+x2R2) \bmod n_c, \qquad \text{Eqn. (7b)}$$

where x2 is the private key $sk_{Ub}$ of the actor, and
$k^{-1}$ is the multiplicative inverse of k mod $n_c$
such that $k^{-1}k \equiv 1 \bmod n_c$ At operation 503, the actor (Party B) broadcasts the payment transaction $T_P$ on the blockchain network 100 for verification and mining. Once verified and successfully mined, the payment transaction $T_P$ is stored as part of a block of the distributed blockchain ledger maintained by the blockchain network 100. After broadcasting the payment transaction $T_P$, the operations of the actor (Party B) in the payment phase 205 ends.

In embodiments, the verification of the payment transaction $T_P$ based on elliptic curve cryptography can involve hashing parts of the payment transaction $T_P$ to form a message m. The public key lock of the transaction output option of the commitment transaction $T_C$, the public key $sK_{Ub}$ of the actor (Party B) and the two-part signatures (R1, S1), (R2, S2) are provided with the payment transaction $T_P$. The two-part signature (R1, S1) based on the private key of 433 can be verified as follows:

Calculate $v1 = S1^{-1} m \times G + S1^{-1} R1 \times y1$
where $S1^{-1}$ is the multiplicative inverse of S1 mod q
such that $S1^{-1} S1 \equiv 1$ mod $n_c$, and
y1 is the public key lock of the transaction output option of the
commitment transaction $T_C$.
Determine that the two-part signature (R1, S1) is valid
if and only if $v1 == R1$ The two-part signature (R2, S2) derived from the private key $sK_{Ub}$ of the actor can be verified as follows:

Calculate $v2 = S2^{-1} m \times G + S2^{-1} R2 \times y2$
where $S2^{-1}$ is the multiplicative inverse of S2 mod q
such that $S2^{-1} S2 \equiv 1$ mod $n_c$, and
y2 is the public key $sK_{Ub}$ of the actor.
Determine that the two-part signature (R2, S2) is valid
if and only if $v2 == R2$ The payment transaction can be verified if and only if both two-part signatures (R1, S1) and (R2, S2) are determined to be valid. Note that in both cases, the elliptic curve has a prime order $n_c$, therefore the mod $n_c$ part of $S^{-1}$ goes away when the elliptic curve point is multiplied with the base point G.

Note that the actor (Party B) may not necessarily be the recipient of the funds of the payment transaction $T_P$, i.e. the actor is not trying to move funds from one of their addresses to a new one which they own the private key of. In this case, the funds can be unlocked with the signature of the recipient and the secret provided by the selector.

FIG. 6 illustrates exemplary details of the refund phase 207. The selector (Party A) need not take part in the refund phase 207 as evident from the operations of FIG. 6. Note that operations of the actor (Party A) in the refund phase 207 can be performed after the payment phase and possibly in response to either i) the actor (Party B) not receiving a private message from the selector (Party A) which includes a randomly secret (one of $k_A^{(1)}$, $k_A^{(2)}$, ... $k_A^{(n)}$) within expiration of the Locktime period of the commitment transaction $T_C$, or ii) the randomly-selected secret included in the received message not matching any one of the data points used to construct the public key locks of the n transaction outputs of the commitment transaction TC in 401.

At operation 601, the actor (Party B) broadcasts the at least one refund transaction $T_R$ constructed in 405 on the blockchain network 100 for verification and mining. Once verified and successfully mined, the least one refund transaction $T_R$ is stored as part of a block of the distributed blockchain ledger maintained by the blockchain network 100. After broadcasting the at least one refund transaction $T_R$, the operations of the actor (Party B) in the refund phase 207 ends.

In embodiments, the verification of the refund transaction $T_R$ based on elliptic curve cryptography can involve hashing parts of the refund transaction $T_R$ to form a message m. The public key $sK_{Ub}$ of the actor (Party B) and a two-part signature (R, S) derived from the private key $sK_{Ub}$ of the actor are provided with the refund transaction $T_R$. The two-part signature (R, S) can be verified as follows:

Calculate $v = S^{-1} m \times G + S^{-1} R \times y$
where $S^{-1}$ is the multiplicative inverse of S mod q
such that $S^{-1} S \equiv 1$ mod $n_c$, and
y is the public key $sK_{Ub}$ of the actor.
Determine that the two-part signature (R, S) is valid
if and only if $v == R$ The refund transaction $T_R$ can be verified if and only if the signature (R, S) is determined to be valid. Note that the elliptic curve has a prime order $n_c$, therefore the mod $n_c$ part of $S^{-1}$ goes away when the elliptic curve point is multiplied with the base point G.

FIG. 7 illustrates certain operations of the methodology of FIGS. 2 to 6.

Note that the examples described above use private messages for communication of information between the actor and the selector. These private messages can use standard encryption techniques to create the cyphertext messages. This could be done with any type of encryption solution (e.g. elliptic curve, RSA, etc.). Essentially, the message can be encrypted (using any encryption scheme) with a public key belonging to the recipient, and then the cyphertext message is sent to the recipient. The recipient may then decrypt the cyphertext message using the private key belonging to the recipient. Note that this is encryption is done only to hide the information contained in the message from any third parties as the recipient can determine/decipher the information represented by the cyphertext using the private key belonging to the recipient.

In alternate embodiments, one or more messages that communicate information between the actor and the selector can openly communicate raw data without involving encryption techniques to create cyphertext. Such unencrypted communication can be suitable if there are no security risks that result from the open communication of the raw data contained in the message(s).

Furthermore, while the examples described above have referred to certain proof-of-work blockchain networks (such as the Bitcoin blockchain network), the methods described herein may also be used with other types of proof-of-work blockchain networks and possibly other proof-of-stake blockchain networks.

FIG. 8 is an illustrative, simplified block diagram of a computing device 2600 that may be used to practice at least one embodiment of the present disclosure. In various embodiments, the computing device 2600 may be used to implement any of the methods and systems illustrated and described above. For example, the computing device 2600 may be configured for use as a data server, a web server, a portable computing device, a personal computer, or any electronic computing device. As shown in FIG. 8, the computing device 2600 may include one or more processors 2602 that may be configured to communicate with, and are operatively coupled to, a number of peripheral subsystems via a bus subsystem 2604. The processors 2602 may be utilized for the processing of the unlocking and locking scripts as part of validating a spending transaction as described herein. These peripheral subsystems may include a storage subsystem 2606, comprising a memory subsystem 2608 and a file/disk storage subsystem 2610, one or more user interface input devices 2612, one or more user interface output devices 2614, and a network interface subsystem 2616. Such storage subsystem 2606 may be used for temporary or long-term storage of information, such as details associated with transactions described in the present disclosure.

The bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses. The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a wireless network such that the data technician may be able to transmit and receive data while in a remote location, such as a user data centre. The bus subsystem 2604 may be utilized for communicating data such as details, search terms, and so on to the supervised model of the present disclosure, and may be utilized for communicating the output of the supervised model to the one or more processors 2602 and to merchants and/or creditors via the network interface subsystem 2616.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600. The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. The storage subsystem 2606 may comprise a memory subsystem 2608 and a file/disk storage subsystem 2610.

The memory subsystem 2608 may include a number of memories, including a main random-access memory (RAM) 2618 for storage of instructions and data during program execution and a read only memory (ROM) 2620 in which fixed instructions may be stored. The file/disk storage subsystem 2610 may provide a non-transitory persistent (non-volatile) storage for program and data files and may include a hard disk drive, a floppy disk drive along with associated removable media, a Compact Disk Read Only Memory (CD-ROM) drive, an optical drive, removable media cartridges, and other like storage media.

The computing device 2600 may include at least one local clock 2624. The local clock 2624 may be a counter that represents the number of ticks that have transpired from a particular starting date and may be located integrally within the computing device 2600. The local clock 2624 may be used to synchronize data transfers in the processors for the computing device 2600 and all of the subsystems included therein at specific clock pulses and may be used to coordinate synchronous operations between the computing device 2600 and other systems in a data centre. In one embodiment, the local clock 2624 is an atomic clock. In another embodiment, the local clock is a programmable interval timer.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 8 is intended only as a specific example for purposes of illustrating the preferred embodiment of the device. Many other configurations having more or fewer components than the system depicted in FIG. 8 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention, as defined by the appended claims. In the claims, any reference signs placed in parentheses shall not be construed as limiting the claims. The words "comprising", "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A blockchain-implemented security method involving a first party and a second party, the method comprising:
    combining encrypted versions of a first plurality of n secrets generated by the first party and encrypted versions of a second plurality of n secrets generated by the second party to generate a plurality of n cryptographic locks;
    randomly selecting one secret belonging to the first plurality of n secrets generated by the first party;
    generating a cryptographic key that unlocks a particular cryptographic lock of the plurality of n cryptographic locks, wherein the particular cryptographic lock corresponds to the randomly selected one secret belonging to the first plurality of n secrets generated by the first party, wherein the plurality of n cryptographic locks is based on linear combinations of the encrypted versions of the first plurality of n secrets generated by the first party and the encrypted versions of the second plurality of n secrets generated by the second party;
    further constructing, by the second party, a first transaction that includes at least one transaction input and a plurality of n transaction outputs, wherein the at least one transaction input of the first transaction points to digital assets of the second party, and wherein the n transaction outputs of the first transaction include locking scripts based on different ones of the plurality of n cryptographic locks for controlled transfer of digital assets of the second party; and
    verifying, by the first party, the first transaction using data derived from the encrypted versions of the first plurality of n secrets as well as the encrypted versions of the second plurality of n secrets without revealing the second plurality of n secrets generated by the second party to the first party, wherein the one secret belonging to the first plurality of n secrets generated by the first party is randomly selected by the first party in response to successful verification of the first transaction.

2. The blockchain-implemented security method according to claim 1, wherein:
    the encrypted versions of the first plurality of n secrets generated by the first party are communicated to the second party without revealing the first plurality of n secrets to the first party; and/or
    the plurality of n cryptographic locks is generated by the second party without revealing the first plurality of n secrets generated by the first party to the second party; and/or the plurality of n cryptographic locks is generated by the second party and verified by the first party to ensure that the plurality of n cryptographic locks is based on allowed combinations of encrypted versions of the first plurality of n secrets generated by the first party and encrypted versions of the second plurality of n secrets generated by the second party; and/or the one secret belonging to the first plurality of n secrets generated by the first party is randomly selected by the first party and securely communicated to the second party; and/or the cryptographic key is generated by the second party without revealing the first plurality of n secrets generated by the first party to the second party.

3. The blockchain-implemented security method according to claim 1, further comprising:

determining, by the second party, a particular transaction output of the first transaction that corresponds to the one secret randomly selected by the first party; and constructing, by the second party, a second transaction which includes a transaction input and at least one transaction output, wherein the transaction input of the second transaction points to the particular transaction output of the first transaction that corresponds to the one secret randomly selected by the first party and includes an unlocking script based upon the cryptographic key that unlocks a cryptographic lock of the particular transaction output of the first transaction, and wherein the at least one transaction output of the second transaction includes an output value and a locking script for controlled transfer of digital assets of the second party.

4. The blockchain-implemented security method according to claim 1, further comprising:

generating, by the second party, the number n for the n transaction outputs of the first transaction;

sending, by the second party, a message to the first party which includes the number n; and receiving, by the first party, the message sent by the first party which includes the number n.

5. The blockchain-implemented security method according to claim 1, further comprising:

generating, by the first party, the first plurality of n secrets;

encrypting, by the first party, the first plurality of n secrets utilizing elliptic curve cryptography to obtain n resultant data points that represent the encrypted versions of the first plurality of n secrets;

sending, by the first party, a message to the second party which includes the n resultant data points;

receiving, by the second party, the message sent by the first party which includes the n resultant data points;

recovering, by the second party, the n resultant data points;

generating, by the second party, the second plurality of n secrets; and encrypting, by the second party, the second plurality of n secrets utilizing elliptic curve cryptography to obtain n resultant data points that represent the encrypted versions of the second plurality of n secrets;

wherein the second party generates the plurality of n cryptographic locks based on linear combinations of the n data points that represent the encrypted versions of the first plurality of n secrets generated by the first party and the n data points that represent the encrypted versions of the second plurality of n secrets generated by the second party.

6. The blockchain-implemented security method according to claim 3, further comprising:

sending, by the first party, a message to the second party which includes the one secret randomly selected by the first party;

receiving, by the second party, the message sent from the first party which includes the one secret randomly selected by the first party;

generating, by the second party, an index associated with the particular transaction output of the first transaction that corresponds to the one secret randomly selected by the first party in response to the message sent from the first party; and generating, by the second party, the cryptographic key based upon the one particular secret randomly selected by the first party and the index associated with the particular transaction output of the first transaction;

wherein the second party uses both the cryptographic key and the index associated with the particular transaction output of the first transaction in constructing the transaction input of the second transaction.

7. The blockchain-implemented security method according to claim 3, wherein:

the locking scripts of the n transaction outputs of the first transaction can be released by respective unlocking scripts that provide signatures corresponding to different ones of the plurality of n cryptographic locks and possibly other required data such as signature derived from a private key belonging to the second party;

the transaction input of the second transaction includes an unlocking script with a signature corresponding to the cryptographic lock of the particular transaction output of the first transaction pointed to by the transaction input and possibly other required data (such as signature derived from the private key belonging to the second party); and the signature corresponding to the cryptographic lock of the particular transaction output is constructed from the cryptographic key generated by the second party based upon the one secret randomly selected by the first party.

8. The blockchain-implemented security method according to claim 3, further comprising:

broadcasting the first transaction on a blockchain network for verification and mining in order to store the first transaction in a blockchain block of the blockchain network; and/or broadcasting the second transaction on the blockchain network for verification and mining in order to store the second transaction in a blockchain block of the blockchain network;

wherein the blockchain is a proof-of-work blockchain or a proof-of-stake blockchain.

9. The blockchain-implemented security method according to claim 3, further comprising:

constructing, by the second party, at least one third transaction in response to failed verification of the first transaction, wherein the third transaction includes at least one transaction input and at least one transaction output, wherein the at least one transaction input of the third transaction points to a transaction output of the first transaction, and wherein the at least one transaction output of the second transaction includes and an output value and a locking script for refunding digital assets to the second party;

wherein the at least one third transaction comprises a single transaction with multiple transaction inputs that refer to the n transaction outputs of the first transaction, or the at least one third transaction comprises n separate transactions each with a transaction input that refers to different ones of the n transaction outputs of the first transaction.

10. The blockchain-implemented security method according to claim 9, wherein:

a private key and public key pair are associated with the second party;

the locking scripts of the n transaction outputs of the first transaction can be released by an unlocking script that provides a signature derived the private key of the second party; and the at least one transaction input of the third transaction points to a corresponding transaction output of the first transaction and includes an unlocking script that provides a signature derived the private key of the second party.

11. The blockchain-implemented security method according to claim 1, wherein:

the first party verifies the first transaction to ensure that the plurality of n cryptographic locks is based on allowed linear combinations of encrypted versions of the first plurality of n secrets generated by the first party and encrypted versions of the second plurality of n secrets generated by the second party; and/or the first party verifies the first transaction utilising data derived from a combination of the encrypted versions of the second plurality of n secrets generated by the second party without revealing the second plurality of n secrets generated by the second party to the first party; and/or the verification of the first transaction involves operations of the form $$(k_B^{(1)}G + k_B^{(2)}G \ldots + k_B^{(n)}G) + (k_A^{(1)}G + k_A^{(2)}G \ldots + k_A^{(n)}G) \stackrel{?}{=} (k_A^{(1)} + k_B^{(1)})G + (k_A^{(2)} + k_B^{(2)})G \ldots + (k_A^{(n)} + k_B^{(n)})G,$$

where $k_A^{(1)}, k_A^{(2)}, \ldots k_A^{(n)}$ are the first plurality of n secrets, $k_B^{(1)}, k_B^{(2)}, \ldots k_B^{(n)}$ are the second plurality of n secrets, and G is a point on an elliptic curve;

$k_A^{(1)}G, k_A^{(2)}G, \ldots k_A^{(n)}G$ are encrypted versions of the first plurality of n secrets; and $k_B^{(1)}G, k_B^{(2)}G, \ldots k_B^{(n)}G$ are encrypted versions of the second plurality of n secrets.

12. A non-transitory computer readable storage medium comprising computer-executable instructions which, when executed, configure a processor to perform any part of the method of claim 1.

13. An electronic device comprising:
an interface device;
a processor coupled to the interface device; and
a memory coupled to the processor, the memory having stored thereon computer executable instructions which, when executed, configure the processor to perform any part of the method of claim 1.

14. A non-transitory computer readable storage medium comprising computer-executable instructions which, when executed, configure a processor to perform any part of the method of claim 2.

15. A non-transitory computer readable storage medium comprising computer-executable instructions which, when executed, configure a processor to perform any part of the method of claim 3.

16. An electronic device comprising:
an interface device;
a processor coupled to the interface device; and
a memory coupled to the processor, the memory having stored thereon computer executable instructions which, when executed, configure the processor to perform any part of the method of claim 2.

17. An electronic device comprising:
an interface device;
a processor coupled to the interface device; and
a memory coupled to the processor, the memory having stored thereon computer executable instructions which, when executed, configure the processor to perform any part of the method of claim 3.

18. An electronic device comprising:
an interface device;
a processor coupled to the interface device; and
a memory coupled to the processor, the memory having stored thereon computer executable instructions which, when executed, configure the processor to perform any part of the method of claim 4.

* * * * *